United States Patent
Matsuyama et al.

(10) Patent No.: US 8,547,510 B2
(45) Date of Patent: Oct. 1, 2013

(54) LIQUID CRYSTAL DISPLAY PANEL AND LIQUID CRYSTAL DISPLAY DEVICE USING THE SAME

(75) Inventors: Hiroaki Matsuyama, Kanagawa (JP); Takahiko Watanabe, Kanagawa (JP)

(73) Assignee: NLT Technologies, Ltd., Kanagawa (JP)

(*) Notice: Subject to any disclaimer, the term of this patent is extended or adjusted under 35 U.S.C. 154(b) by 990 days.

(21) Appl. No.: 12/193,259

(22) Filed: Aug. 18, 2008

(65) Prior Publication Data

US 2009/0046232 A1 Feb. 19, 2009

(30) Foreign Application Priority Data

Aug. 17, 2007 (JP) ................. 2007-212617

(51) Int. Cl.
*G02F 1/1335* (2006.01)
(52) U.S. Cl.
USPC ............ 349/114; 349/139; 349/141; 349/144
(58) Field of Classification Search
None
See application file for complete search history.

(56) References Cited

U.S. PATENT DOCUMENTS

| | | | | |
|---|---|---|---|---|
| 6,504,594 | B2* | 1/2003 | Ohe et al. ................ | 349/141 |
| 7,593,078 | B2* | 9/2009 | Ochiai et al. ............. | 349/114 |
| 7,982,840 | B2* | 7/2011 | Segawa et al. ........... | 349/141 |
| 7,995,181 | B2* | 8/2011 | Choi et al. ............... | 349/141 |
| 2007/0064189 | A1* | 3/2007 | Hong et al. .............. | 349/141 |
| 2007/0085958 | A1* | 4/2007 | Lin et al. ................. | 349/141 |
| 2008/0036932 | A1* | 2/2008 | Lee .......................... | 349/38 |

FOREIGN PATENT DOCUMENTS

| | | |
|---|---|---|
| JP | 11-316383 | 11/1999 |
| JP | 2000-10110 | 1/2000 |
| JP | 2000-89255 | 3/2000 |
| JP | 2000-356786 | 12/2000 |
| JP | 2001-56474 | 2/2001 |
| JP | 2001-59976 | 3/2001 |
| JP | 2001-117118 | 4/2001 |
| JP | 2002-31812 | 1/2002 |
| JP | 2002-365657 | 12/2002 |
| JP | 3481509 | 10/2003 |
| JP | 2003-322869 | 11/2003 |
| JP | 2003-344837 | 12/2003 |
| JP | 2006-31022 | 2/2006 |

(Continued)

OTHER PUBLICATIONS

Dong hun Lim et al., "High Performance Mobile Application With the High Aperture Ratio FRS (HFFS) Technology", AMDp-32L, Boe-Hydis Technology, Co. Ltd. Ichon-si, Kyoungki-do 467-701, Korea.

(Continued)

*Primary Examiner* — Richard Kim
(74) *Attorney, Agent, or Firm* — Young & Thompson

(57) ABSTRACT

A liquid crystal display panel for displaying an image by controlling an orientation direction of a liquid crystal mixture with respect to each pixel, includes a first common electrode which is formed on a first substrate; a second common electrode which is formed on a second substrate and includes a predetermined opening; and a pixel electrode which is formed on the second substrate, wherein the first substrate faces the second substrate so that the liquid crystal mixture with positive dielectric anisotropy is sandwiched between the first common electrode and the second common electrode, and wherein the orientation direction of the liquid crystal mixture changes mainly in a face parallel to the substrate according to an electric field generated from electric potential of the first common electrode, the second common electrode, and the pixel electrode.

8 Claims, 17 Drawing Sheets

(56) References Cited

FOREIGN PATENT DOCUMENTS

| JP | 2006-39369 | 2/2006 |
|----|------------|--------|
| JP | 2006-317905 | 11/2006 |
| JP | 2007-86657 | 4/2007 |
| JP | 2007-334177 | 12/2007 |
| JP | 2008-76501 | 4/2008 |

OTHER PUBLICATIONS

Official Action issued Nov. 27, 2012 by the Japanese Patent Office in Japanese Patent Application No. 2008-203913, with English translation of portions within the wavy lines.

* cited by examiner

LIQUID CRYSTAL DISPLAY PANEL AND LIQUID CRYSTAL DISPLAY DEVICE USING THE SAME

INCORPORATION BY REFERENCE

This application is based upon and claims the benefit of priority from Japanese Patent Application No. 2007-212617, filed on Aug. 17, 2007, the disclosure of which is incorporated herein in its entirety by reference.

TECHNICAL FIELD

The present invention relates to a liquid crystal display (LCD) panel for displaying an image by controlling an orientation direction of a liquid crystal mixture by a pixel unit, and an LCD device using the same.

BACKGROUND ART

An LCD device provided with an LCD panel having a wide view is known.

Such an LCD panel includes a liquid crystal mixture which responds to an electric field and changes an orientation direction thereof.

A light which passes through the liquid crystal mixture is deflected according to the orientation direction of the liquid crystal mixture, and a light having luminance according to level of the deflection is emitted from the LCD panel.

Accordingly, the electrodes for generating the electric field are provided in the LCD panel.

An image is displayed by controlling electric potential of the electrodes.

As such LCD panel, a panel using an IPS (In-Plane Switching) type, a VA (Vertical Alignment) type and an FFS (Fringe-Field Switching) type are well known.

Each of the types is characterized by an orientation proceeding of the liquid crystal mixture at the time of displaying an image, structure of a plurality of electrodes, a method of applying a voltage to an electrode, a type of dielectric anisotropy of the liquid crystal mixture, etc.

As for a liquid crystal mixture in which dielectric constant of a long axial direction (parallel direction) thereof is different from dielectric constant of a short axial direction (antiparallel direction) thereof, it is described that the liquid crystal mixture in which the dielectric constant of the long axial direction is lager than the other includes positive dielectric anisotropy, and it is described that the liquid crystal mixture in which the dielectric constant of the short axial direction is larger than the other includes negative dielectric anisotropy.

In the LCD panel of the IPS type, two electrodes to generate an electric field are arranged in parallel at a predetermined interval on one substrate.

An initial orientation direction of the liquid crystal mixture is set in a direction parallel to a face of the substrate. The initial orientation direction of the liquid crystal mixture means an orientation direction which is oriented when an electric field is not applied to the liquid crystal mixture.

When electric potential is given between the two electrodes, an electric field substantially parallel to the face of the substrate generates and the liquid crystal mixture changes the orientation direction thereof according to the electric field.

Accordingly, when the electric field is controlled, the orientation direction of the liquid crystal mixture changes mainly in the face parallel to the substrate.

As such liquid crystal mixture, although a liquid crystal material with positive dielectric anisotropy or negative dielectric anisotropy can be used, the liquid crystal material with the positive dielectric anisotropy is usually used.

On the other hand, the LCD panel of the VA type includes a structure in which the liquid crystal mixture is arranged between substrates facing each other on which electrodes are arranged respectively.

In the LCD panel of the VA type, an electric field is generated in a direction mainly vertical to a substrate face.

The initial orientation direction of the liquid crystal mixture is set in the direction vertical to the substrate face.

When electric potential is applied between the two electrodes, an electric field mainly vertical to the substrate face generates and the liquid crystal mixture changes an orientation direction by responding to the electric field.

Accordingly, by controlling the electric field, the orientation direction of the liquid crystal mixture changes mainly in the face vertical to the substrate.

As the liquid crystal mixture for such LCD panels, liquid crystal materials with negative dielectric anisotropy are usually used.

A contrast deteriorates remarkably when the liquid crystal mixture with positive dielectric anisotropy is used in the LCD panel of the VA type compared with the LCD panel using the liquid crystal mixture with the negative dielectric anisotropy.

When the liquid crystal mixture with positive dielectric anisotropy is used, the initial orientation direction of the liquid crystal mixture is oriented in the direction parallel to the substrate face.

In the LCD panel of the FFS type, the orientation direction of the liquid crystal mixture is controlled according to change of the direction of an electric field generated between electrodes. The following two are known as a configuration of the LCD panel of the FFS type.

One configuration is proposed in Japanese Patent Application Laid-Open No. 1999-316383, Japanese Patent Application Laid-Open No. 2000-10110, Japanese Patent Application Laid-Open No. 2000-89255, Japanese Patent Application Laid-Open No. 2001-56474, Japanese Patent Application Laid-Open No. 2001-59976 and "High Performance mobile application with the High aperture ratio (HFFS) Technology", Dong hun Lim et al., Asia Display/IDW'13, AMDp=32L, p. 807-80, for example.

In the configuration concerning the proposals, two electrodes are formed close on one substrate. An electric field generates mainly in the direction parallel to the substrate face.

In this case, responding to the electric field which generates at the edges of the electrodes, the orientation direction of the liquid crystal mixture changes mainly in the face parallel to the substrate.

As the liquid crystal mixture of such LCD panel, although the liquid crystal material with positive dielectric anisotropy or negative dielectric anisotropy is used, the liquid crystal material with positive dielectric anisotropy is usually used.

In other configuration, the electrodes are provided on each of two facing substrates, and an electric field mainly vertical to the substrate is generated.

In this case, the orientation direction of the liquid crystal mixture changes mainly in the face vertical to the substrate.

As the liquid crystal mixture, the liquid crystal material with the negative dielectric anisotropy is used like the LCD panel of the VA type.

In the LCD panel of a configuration in which the orientation direction of the liquid crystal mixture changes mainly in the face parallel to the substrate, display irregularity due to a vertical electric field in a direction vertical to the substrate face occurs.

Japanese Patent No. 3481509, Japanese Patent Application Laid-Open No. 2002-31812 and Japanese Patent Application Laid-Open No. 2003-322869 disclose a configuration in which electrodes are arranged on facing substrates and the liquid crystal mixture with the negative dielectric anisotropy is utilized.

FIGS. 21 and 22 are partial cross sections of such LCD panel.

In the LCD panel shown in FIGS. 21 and 22, a first substrate 3100 provided with a first common electrode 3101 and a second substrate 3200 provided with pixel electrodes 3201 are arranged, so that a liquid crystal layer 3300 composed of a liquid crystal mixture of negative dielectric anisotropy is sandwiched therebetween.

The first substrate 3100 includes a polarizer 3102 on a light emitting face, and the second substrate 3200 includes a polarizer 3202 on a light incidence face.

Further, the second substrate 3200 in FIG. 21 includes a second common electrode 3204 and an insulating film 3203, and the pixel electrode 3201 are formed on the insulating film 3203.

On the other hand, the second substrate 3200 in FIG. 22 includes the insulating film 3203, and the pixel electrodes 3201 are formed on the insulating film 3203.

The liquid crystal mixture with the negative dielectric anisotropy has a narrow selection range of physical values, for example, refractive index anisotropy and dielectric anisotropy, compared with the liquid crystal mixture with the positive dielectric anisotropy.

Accordingly, in order to improve display characteristics in the above-mentioned configuration, development of a liquid crystal mixture having a wide selection range of physical values, for example, refractive index anisotropy and dielectric anisotropy, is required.

For example, in order to improve display characteristics, a response time of display characteristics is shortened by using a liquid crystal mixture with low rotation viscosity.

However, since the current liquid crystal mixture with the negative dielectric anisotropy has high rotation viscosity compared with the liquid crystal mixture with the positive dielectric anisotropy, it is difficult to shorten the response time.

In order to improve display characteristics, a method of driving by low voltage is known.

An effective method of driving by low voltage is to use a liquid crystal mixture with large dielectric anisotropy.

However, since the dielectric anisotropy of the liquid crystal mixture with the negative dielectric anisotropy is generally small compared with that of the liquid crystal mixture with the positive dielectric anisotropy, it is difficult to realize the method of driving by low voltage.

Then, Japanese Patent Application Laid-Open No. 2002-365657 discloses an LCD panel in which the liquid crystal mixture with the positive dielectric anisotropy is sandwiched with facing substrates each having an electrode, as shown in FIGS. 23A, 23B.

FIGS. 23A, 23B are a partial cross section of such LCD panel.

The LCD panel includes a first substrate 4100 having a first common electrode 4101, the second substrate 4200 having a pixel electrode 4201, and the liquid crystal layer 4300 composed of a liquid crystal mixture with positive dielectric anisotropy sandwiched with the first substrates 4100 and the second substrate 4200.

The LCD panel further includes a second common electrode 4202 arranged upper the pixel electrode 4201 (the first substrate 4100 side), and the alignment films 4102 and 4203 provided on a side of the liquid crystal layer 4300 of the first substrate 4100 and the second substrate 4200. The alignment film 4203 is formed on the second common electrode 4202.

When electric potential V is applied to the pixel electrode 4201 and the second common electrode 4202, and electric potential Vo is applied to the first common electrode 4101, an electric field Ev is generated in the liquid crystal layer 4300. An liquid crystal molecule M responds to the electric field Ev and is oriented in a direction vertical to the substrate face (refer to FIG. 23A).

When the electric potential V is applied to the second common electrode 4202 and the electric potential Vo is applied to the first common electrode 4101 and the pixel electrode 4201, an electric field EL is generated between the pixel electrode 4201 and the second common electrode 4202.

Then, since an electric field almost not being generated in the liquid crystal layer 4300, the liquid crystal molecule M is oriented in parallel with the substrate face (refer to FIG. 23B).

However, in the above-mentioned constitution, a vertical electric field vertical to the substrate face changes an orientation direction of the liquid crystal mixture mainly in a face vertical to the substrate.

Accordingly, when the image is displayed by changing the orientation direction of the liquid crystal mixture in the face parallel to the substrate, even if above-mentioned constitution is applied, the orientation direction of the liquid crystal mixture does not change greatly in the face parallel to the substrate.

Therefore, improvement of the display characteristics is difficult.

Because the orientation direction of the liquid crystal mixture changes greatly in the face vertical to the substrate by the vertical electric field, it becomes difficult to obtain good display quality.

On the other hand, Japanese Patent Application Laid-Open No. 2006-39369 proposes a semi-transmissive LCD panel in which a transmissive display area which displays an image according to a transmitted light, and a reflective display area which displays an image by a reflected light are arranged within one pixel.

FIG. 24 is a cross sectional view of one pixel in the LCD panel.

The LCD panel includes a first substrate 5100, a second substrate 5200 and a liquid crystal layer 5300 sandwiched between the first substrates 5100 and second substrates 5200.

The ½ wavelength plates 5102 and 5103 and a first common electrode 5104 are provided in a reflective display area R1 of the first substrate 5100.

A first insulating film 5201 is provided on the second substrate 5200.

A second insulating film 5202 and a second pixel electrode 5203 are provided on the first insulating film 5201 of the reflective display area R1.

A first pixel electrode 5204 and a second common electrode 5205 are provided on the first insulating film 5201 of the transmissive display area R2.

Further, a common electrode is not provided on the first substrate 5100 in the transmissive display area R2.

And in the reflective display area R1, an electric field vertical to the substrate face generates between the second pixel electrode 5203 and the first common electrode 5104.

In the transmissive display area R2, an electric field parallel to the substrate face generates mainly between the first pixel electrode 5204 and the second common electrode 5205.

In a reflective display area R1, since an external light enters from a side of the first substrate 5100 is reflected by the second pixel electrode 5203 and an image is displayed, a backlight is unnecessary.

On the other hand, in a place without an external light, by turning on a backlight, a light from the backlight enters from a side of the second substrate 5200 side, and is emitted after being deflected in the transmissive display area R2. Therefore, the image display is possible also in the place without the external light.

SUMMARY

A main purpose of the present invention is to provide an LCD panel and an LCD device which can suppress display irregularity etc., and can display an image with high quality without degrading display characteristics by a vertical electric field, when a material with positive dielectric anisotropy is used as a liquid crystal mixture.

An LCD panel for displaying an image by controlling an orientation direction of a liquid crystal mixture with respect to each pixel, includes a first common electrode which is formed on a first substrate; a second common electrode which is formed on a second substrate and includes a predetermined opening; and a pixel electrode which is formed on the second substrate, wherein the first substrate face the second substrate so that the liquid crystal mixture with positive dielectric anisotropy is sandwiched between the first common electrode and the second common electrode, and wherein the orientation direction of said liquid crystal mixture changes mainly in a face parallel to the substrate according to an electric field generated from electric potential of the first common electrode, the second common electrode, and the pixel electrode.

BRIEF DESCRIPTION OF THE DRAWINGS

Exemplary features and advantages of the present invention will become apparent from the following detailed description when taken with the accompanying drawings in which.

EXEMPLARY EMBODIMENT

Exemplary embodiments of the present invention will now be described in detail in accordance with the accompanying drawings.

Figure 21:
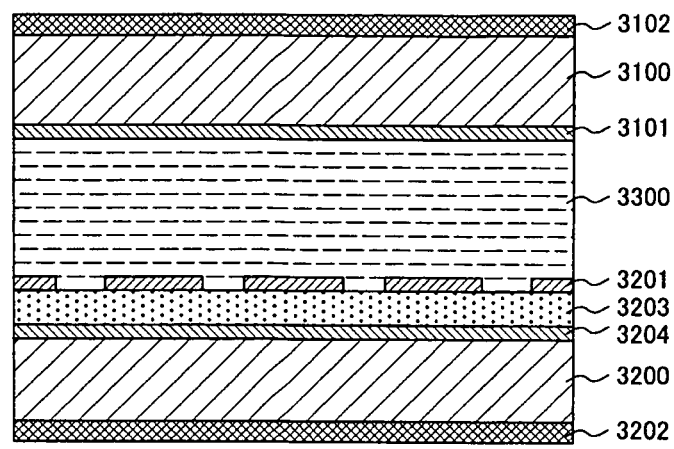
FIG. 21 is a cross sectional view showing a configuration of an LCD device of a related art.
Figure 22:
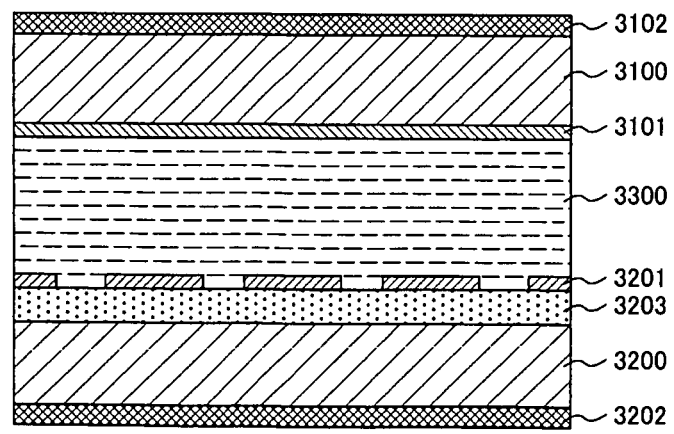
FIG. 22 is a cross sectional view showing a configuration of an LCD device of other related art.

A related art is considered before explanation of exemplary embodiments. A liquid crystal mixture with negative dielectric anisotropy used for a configuration shown in FIG. 21 or FIG. 22 has a narrow selection range of physical values, for example, a refractive index anisotropy and dielectric anisotropy, compared with a liquid crystal mixture with positive dielectric anisotropy. Accordingly, it is difficult for a current material to improve display characteristics.

Figure 23A:
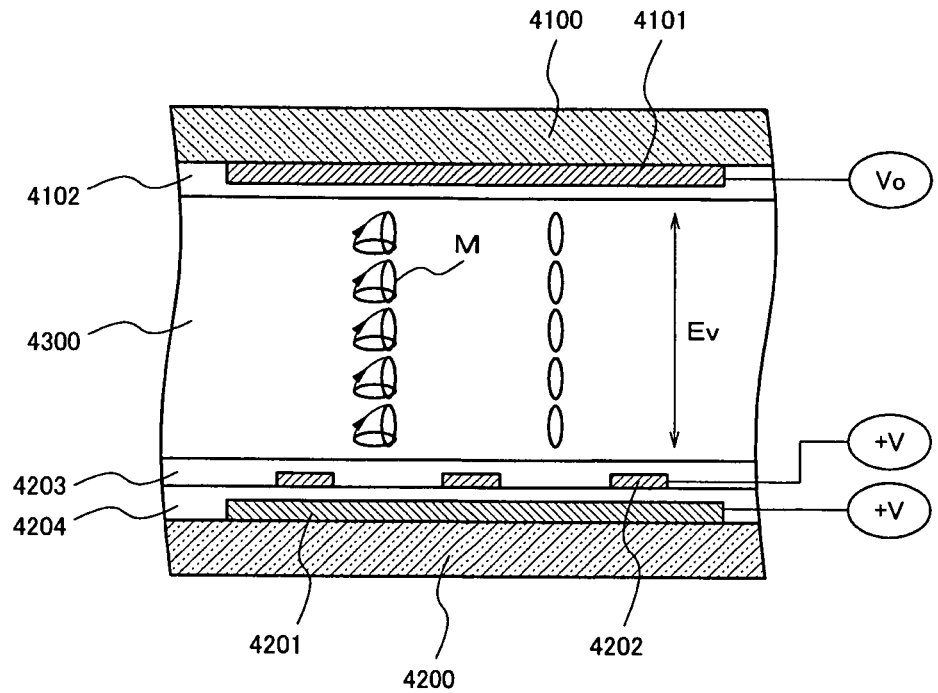
FIG. 23A, 23B are a cross sectional view showing a configuration of an LCD device of other related art; and, FIG. 24 is a cross sectional view showing a configuration of an LCD device of other related art.
Figure 23B:
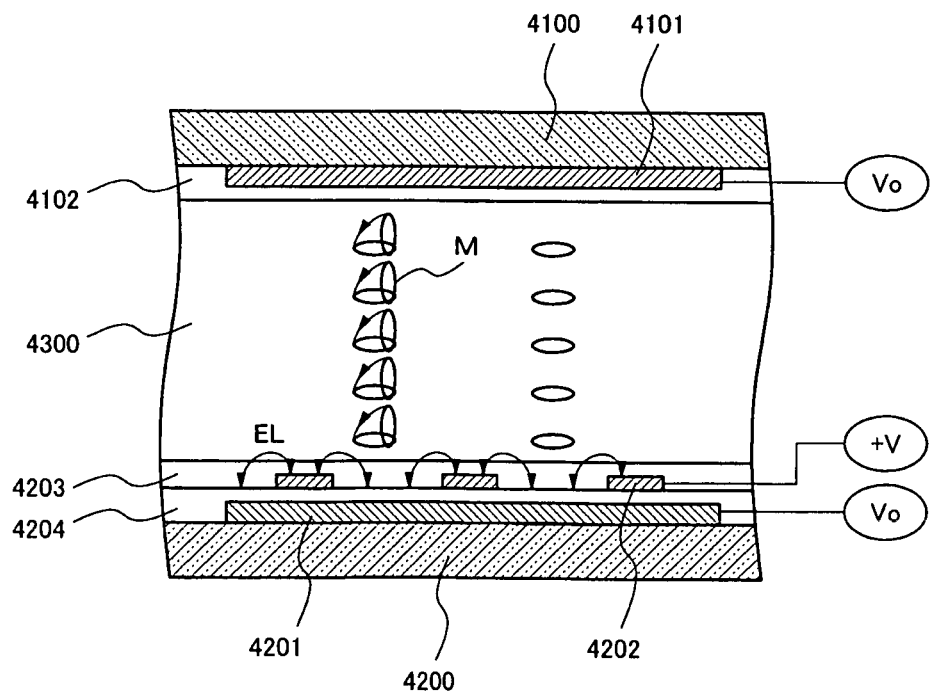

In a configuration shown in FIG. 23, even if it changes the orientation direction of the liquid crystal mixture in the face parallel to the substrate, the improvement of display characteristics is difficult. This is because the orientation direction of the liquid crystal mixture cannot be changed largely in the face parallel to the substrate.

Figure 24:
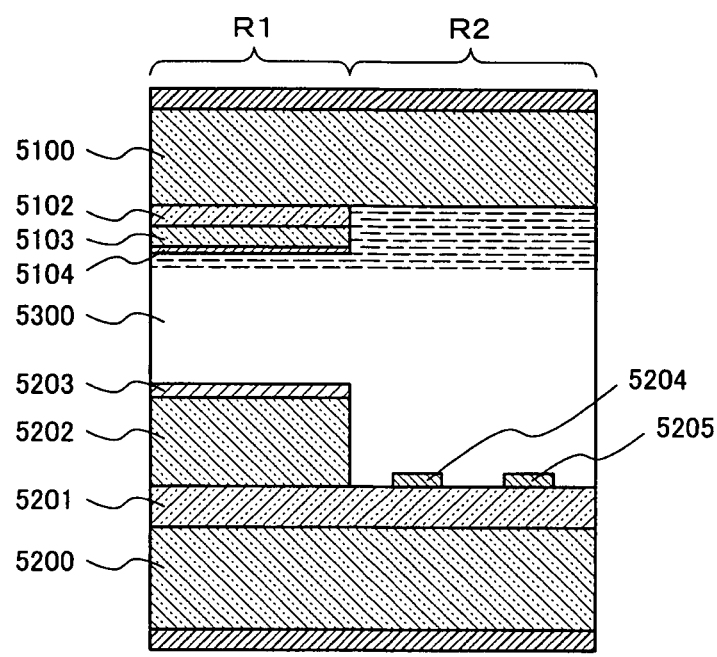

A configuration as shown in FIG. 24 has the feature in which display characteristics fluctuate easily.

That is, a patterning process is required in order to form a first common electrode 5104 only in the reflective display area R1.

Then, a shape of the first common electrode 5104 becomes irregular due to processing error and the like in the patterning process.

The irregularity of the shape of the first common electrode 5104 causes fluctuation in electric field distribution generated between the first common electrode 5104 and a second pixel electrode 5203 in the reflective display area R1.

In addition, the irregularity of the shape of the first common electrode 5104 causes fluctuation in electric field distribution generated between a first pixel electrode 5204 and a second common electrode 5205 in the transmissive display area R2.

The fluctuation in the electric field distribution influences an orientation state of the liquid crystal mixture which forms the liquid crystal layer 5300, and causes variation in the display characteristics. The positional relationship between each electrode fluctuates according to the accuracy of opposite arrangement of the first substrate 5100 and the second substrate 5200.

The fluctuation of positional relation among the electrodes may cause variation in display characteristics.

Embodiments of the present invention based on above described consideration will be described below.

A first exemplary embodiment of the present invention will be described.

Figure 1:
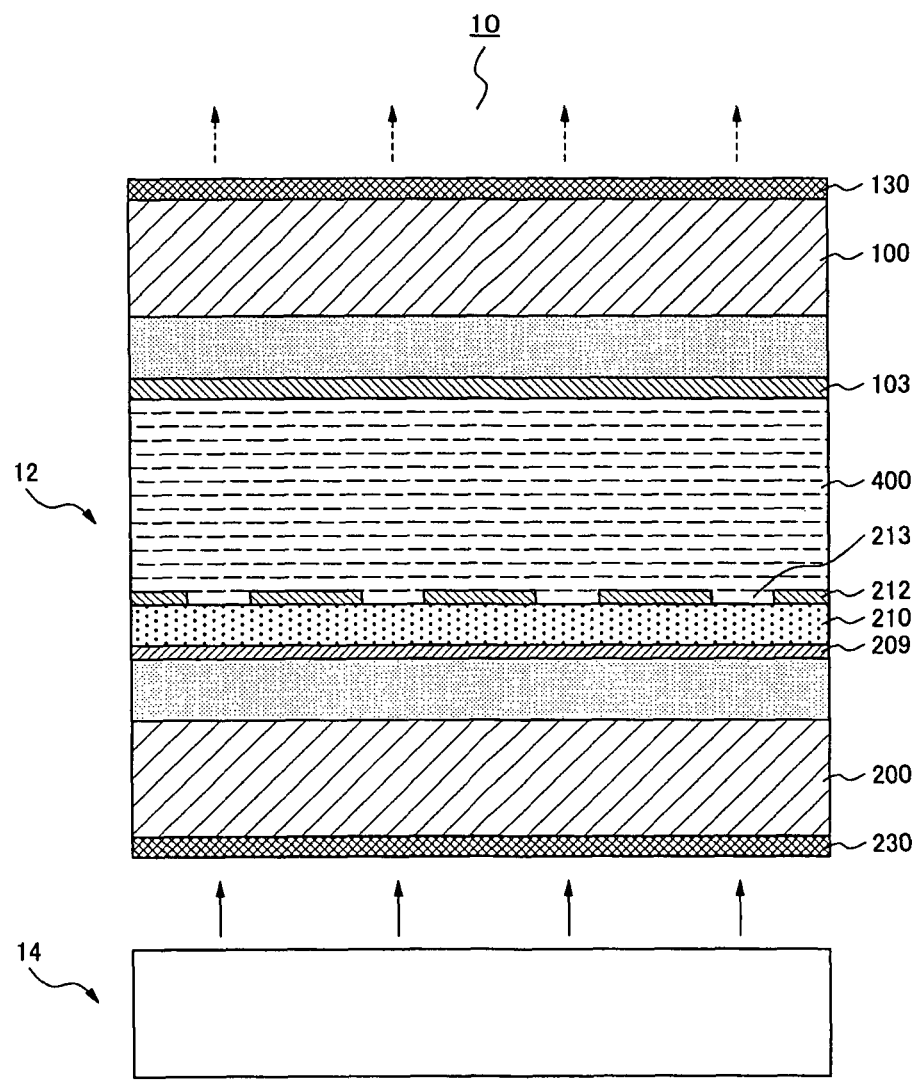
FIG. 1 is a cross sectional view showing a configuration of one pixel of an LCD device according to a first exemplary embodiment of the present invention.

FIG. 1 is a partial cross section of an LCD device according to the first exemplary embodiment.

An LCD device 10 includes an LCD panel 12 and a backlight 14.

The LCD panel 12 includes a first substrate 100 and a second substrate 200 which face each other, and a liquid crystal layer 400 which includes a liquid crystal mixture sandwiched by the first substrate 100 and the second substrate 200.

The liquid crystal mixture includes positive dielectric anisotropy.

The LCD panel 12 includes a first common electrode 103 formed on the first substrate 100, a second common electrode 212 and a pixel electrode 209 formed on the second substrate 200.

A second insulating film 210 is formed between the second common electrode 212 and the pixel electrode 209.

The second common electrode 212 is located at a position closer to the liquid crystal layer 400 than the pixel electrode 209, and the second common electrode 212 includes an opening 213 and a non-opening.

The opening 213 is a hole which penetrated the second common electrode 212 in a thickness direction of thereof.

The non-opening means areas other than the opening 213 of the second common electrode 212, and is a portion which functions as an electrode.

The LCD panel 12 further includes polarizers 130 and 230 each having an optical film, respectively on a light emitting surface of the first substrate 100 and an incident surface of the second substrate 200.

In FIG. 1, solid line arrows indicate luminous flux which enters the LCD panel 12 from the backlight 14, and dotted line arrows indicate luminous flux emitted from the LCD panel 12.

In such a configuration, only a light which has the same deflection component as the polarizer 230 among lights from the backlight 14 enters the LCD panel 12.

When electric potential is applied to the first common electrode 103, the second common electrode 212, and the pixel electrode 209, an electric field generates. The electric field has distribution according to the electric potential of each electrode, shape of the opening 213, etc.

The liquid crystal mixture responds to the electric field and changes an orientation direction thereof. The electric field changes mainly in a face parallel to the first substrate 100.

The light which passed liquid crystal layer 400 is deflected corresponding to the orientation direction of the liquid crystal mixture, and is incident into polarizer 130.

And only light with the same deflection component as polarizer 130 passes this polarizer 130.

The LCD panel 12 in the LCD device having such configuration is provided with a feature described below.

(Feature 1: Electrode Configuration)

As mentioned above, the LCD panel 12 includes the first common electrode 103 formed on the first substrate 100, and the second common electrode 212 and the pixel electrode 209 formed on the second substrate 200.

The second common electrode 212 is formed in a position nearer to the liquid crystal layer 400 than the pixel electrode 209, and the opening 213 is formed in a thickness direction so that the pixel electrode 209 in a lower layer may appear.

Accordingly, an orientation direction of the liquid crystal mixture is controlled according to electric fields which the pixel electrode 209, the first common electrode 103, and the second common electrode 212 generate.

In particular, the orientation direction of the liquid crystal mixture mainly in a face parallel to the substrate is excellently controllable.

(Feature 2: Initial Orientation Direction of Liquid Crystal Mixture)

An angle between an initial orientation direction of the liquid crystal mixture and a long direction of the opening 213 of the second common electrode 212 is 1 or more degrees and 30 degrees or less.

The long direction is a longitudinal direction in the opening 213 of approximately rectangular shape.

The initial orientation direction of the liquid crystal mixture is an orientation direction of the liquid crystal mixture which is set when an electric field is not applied to the liquid crystal mixture.

The initial orientation direction is given by rubbing treatment and the like.

Being set in such angle range, the orientation direction of the liquid crystal mixture becomes uniform as a whole and can be widely changed.

Accordingly, luminance of the LCD panel improves substantially.

(Feature 3: Electrode Material)

A part of or a whole of the first common electrode 103, the second common electrode 212 and the pixel electrode 209 is made of a transparent conductive material, for example, ITO (Indium Tin Oxide).

Accordingly, since light passing through the LCD panel 12 is not shaded by these electrodes, a view does not become narrow.

(Feature 4: Width in Opening of Second Common Electrode)

The width of the opening 213 of the second common electrode 212 is 1 μm or more and 4 μm or less.

When the width of the opening 213 is set in such range, control which suppresses influence of a vertical electric field is possible and the LCD panel can be driven with a suitable driving voltage.

Accordingly, luminance of the LCD panel improves substantially.

(Feature 5: Width in Non-opening of Second Common Electrode)

The width of the non-opening of the second common electrode 212 is 1 μm or more 6 μm or less. The width of the non-opening corresponds to an interval between the openings.

When the width of the non-opening of the second common electrode 212 is set in such range, degradation of luminance and inhomogeneousity of an image display due to the vertical electric field can be suppressed, and the LCD panel can be driven with a suitable driving voltage.

(Feature 6: Liquid Crystal Layer)

A product (Δn×d) of the refractive index anisotropy (Δn) of the liquid crystal mixture and thickness (d) of the liquid crystal layer 400 is 400 nm or more and 1000 nm or less with respect to an incident light with a wavelength of 589 nm.

Thereby, luminance of the LCD panel improves substantially.

(Feature 7: Display Mode)

The display mode of LCD panel 12 is the normally black mode. Therefore, since it becomes available to enlarge luminance difference, the image display with high quality becomes available.

(Feature 8: Configuration of Common Electrode)

The LCD panel 12 includes a plurality of pixels formed in a matrix form.

The first common electrodes 103 of neighboring pixels are electrically connected to each other, and the second common electrodes 212 of neighboring pixels are electrically connected to each other.

Accordingly, the first common electrodes 103 and the second common electrodes 212 of each pixel can be driven together.

It is possible to conduct the first common electrode 103 with the second common electrode 212 electrically.

In this case, the potential apply to the first common electrode 103 and the second common electrode 212 is easy.

(Feature 9: Electric Potential Configuration of Each Electrode)

A value of electric potential of the first common electrode 103, the second common electrode 212, and the pixel electrode can be set optionally. Accordingly, an electric potential of each electrode can be set so that a displaying state is kept in the best condition.

The electric potential of the first common electrode 103 and the second common electrode 212 can be given by the same signal.

Accordingly, drive circuit configuration becomes simple and the electric potential to apply can be set easily.

(Feature 10: Insulating Film and Liquid Crystal Layer)

An following equation holds, $$(\in_i \times d + \in_\parallel \times t)/(\in_i + \in_\parallel \times t) \geq 2$$

wherein a dielectric constant of the second insulating film 210 is $\in_i$, thickness thereof is t, a dielectric constant (parallel direction) of the liquid crystal mixture is $\in_\parallel$ and thickness of the liquid crystal layer 400 is d.

Thereby, the LCD panel 12 with large luminance can be provided.

Since the LCD device using the LCD panel 12 with the above features includes the first common electrode 103 and the liquid crystal mixture with positive dielectric anisotropy, the liquid crystal mixture which is suitable for short response time, low driving voltage, etc. can be selected from existing materials.

Accordingly, since display inhomogeneousity, degrading display characteristics due to the vertical electric field, etc. are suppressed by using the liquid crystal mixture of positive dielectric anisotropy, the LCD device can perform the image display with high quality.

The chemical and electrical influence of the light shielding layer and the color layer or the like which were laminated on the first substrate 100 is blocked by the first common electrode 103 on the first substrate 100.

Figure 2:
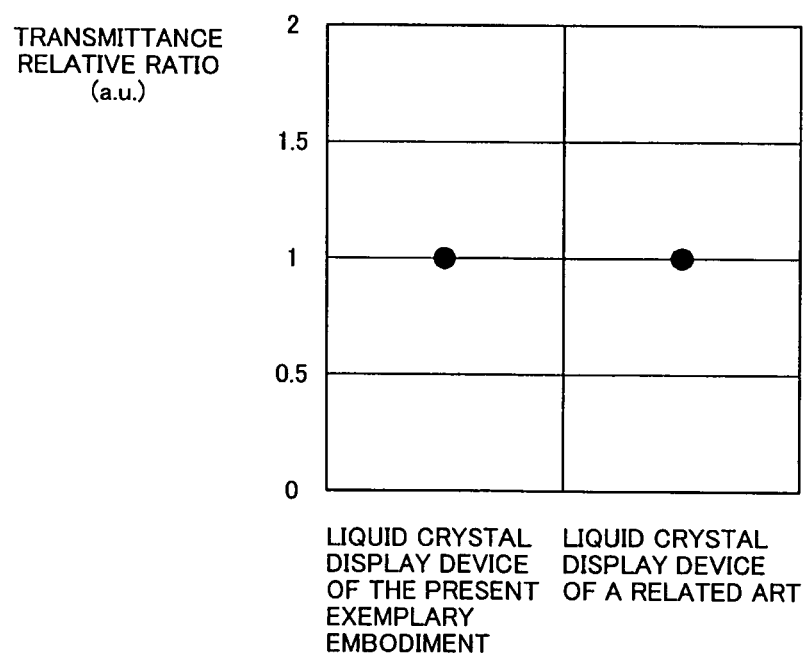
FIG. 2 is a graph which shows a comparison between transmittance relative value of the LCD device of the first exemplary embodiment of the present invention and an LCD device of a FFS type of a related art thereof.

FIG. 2 is a graph illustrating comparison between a transmittance relative ratio as an optical property of an LCD device according to the present exemplary embodiment and a FFS type.

In each liquid crystal display, the liquid crystal mixture with the same positive dielectric anisotropy is used, and the same light shielding layer and a same color layer are used.

FIG. 2 shows that transmission of the LCD device of the present exemplary embodiment and the FFS type is equivalent.

Accordingly, in the LCD device of the present exemplary embodiment, since material selection ranges, such as the light shielding layer and the color layer or the like, become large, compared with LCD device without the first common electrode 103, stable image display can be realized.

Since electric potential applied to the first common electrode 103 and second common electrode 212 can be given with same signal even if an electrode configuration includes three electrodes of the first common electrode 103, the second common electrode 212, and the pixel electrode 209, the LCD device of the exemplary embodiment can be driven like a general active-matrix type LCD device.

Accordingly, driving methods, for example, general pixel inversion driving and gate line inversion driving become possible.

A manufacturing process identical to that of an LCD device of a well-known twisted nematic (TN) mode is applicable to the configuration.

Further, the process which makes the substrate thin by mechanical polishing and/or etching used in order to manufacture the thin type LCD device is applicable.

Accordingly, manufacture of the LCD device becomes easy, and the display quality of the LCD device improves.

In the IPS type and/or the FFS type, an ITO film may be formed on a face (face of the opposite side of a liquid crystal layer) of the first substrate by a sputtering method.

In this case, formation of the ITO film cannot be performed before the processes, such as mechanical polishing and the etching. However, in this exemplary embodiment, since the ITO film is formed on the face by the side of the liquid crystal layer of the first substrate, the ITO film can be formed before the processes, such as mechanical polish.

Next, a second exemplary embodiment will be described.

Regarding the same configuration as the above-mentioned exemplary embodiment, description is suitably omitted using same symbol.

Figure 3:
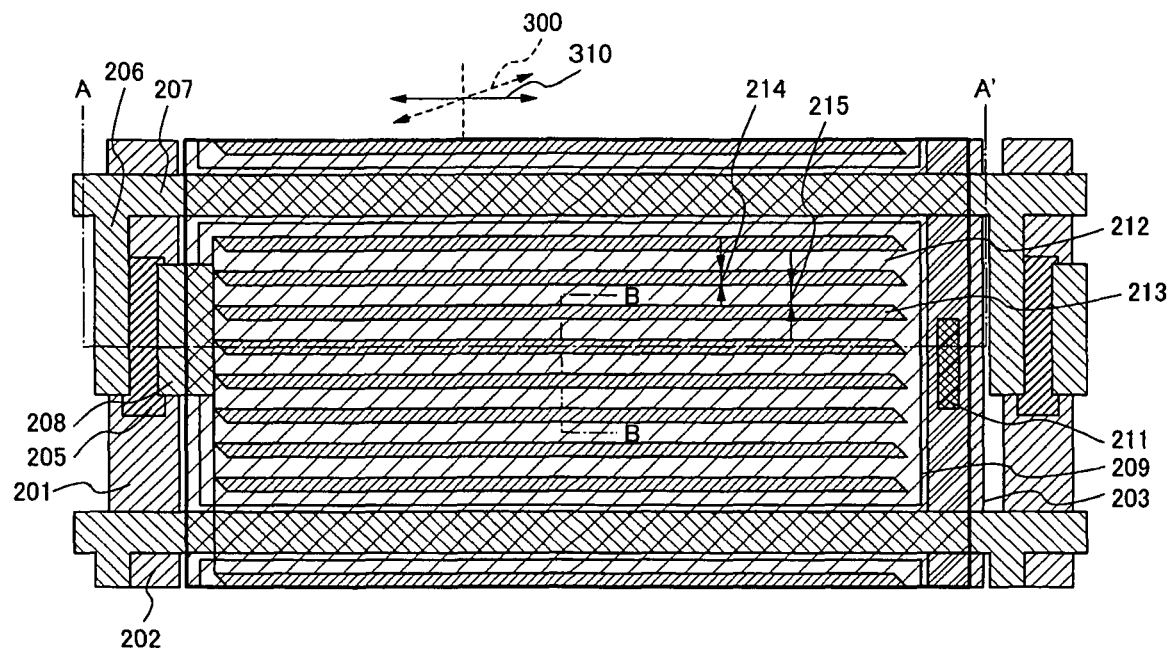
FIG. 3 is a plan view showing a configuration of one pixel of an LCD panel according to a second exemplary embodiment of the present invention.
Figure 4:
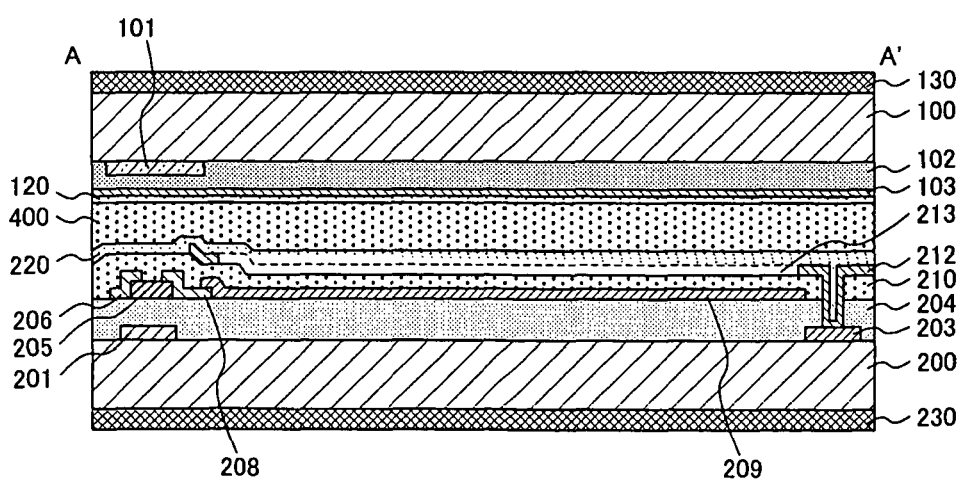
FIG. 4 is a cross sectional view along A-A' line of FIG. 3 according to the second exemplary embodiment of the present invention.

FIG. 3 is a plan view corresponding to one pixel of an LCD panel, and FIG. 4 is a cross sectional view along an A-A' line of FIG. 3.

The LCD panel includes a first substrate 100 and a second substrate 200 which face each other and a liquid crystal layer 400 composed of a liquid crystal mixture sandwiched between the first substrate 100 and the second substrate 200.

The first substrate 100 and the second substrate 200 include transparent member like a glass.

The liquid crystal mixture includes the liquid crystal with positive dielectric anisotropy.

The LCD panel includes a first common electrode 103 formed on the first substrate 100, a second common electrode 212 and a pixel electrode 209 formed on the second substrate 200.

A second insulating film 210 is formed between the second common electrode 212 and the pixel electrode 209.

The second common electrode 212 is arranged in a position nearer to the liquid crystal layer 400 than the pixel electrode 209. The second common electrode 212 includes an opening 213 and a non-opening.

The first substrate 100 includes a light shielding film 101 composed of an opaque metal (e.g. Chromium) or an organic layer (e.g. acrylic containing a carbon) and includes a color layer 102 for performing color display.

The first common electrode 103 is formed on the color layer 102. The first common electrode 103 is formed by patterning an electric conduction film. The electric conduction film is the transparent film, such as ITO formed by the sputtering method etc. Patterning of the electric conduction film is performed using the photolithography method etc.

A gate electrode 201 and a gate wiring line 202 are formed on the second substrate 200.

The gate electrode 201 and gate wiring 202 are formed by patterning the metal film The metal film is a single metal layer, such as Chromium, or multilayer metal film, such as Chromium and ITO, which were formed by using the sputtering method etc. Patterning of the metal film is performed using the photolithography method etc.

When Chromium whose resistivity is lower than ITO is used as a material of the gate electrode 201 and the gate wiring 202, joint part 203 can be formed simultaneously with the gate electrode 201 and the gate wiring 202.

A first insulating film 204 is formed on the gate electrode 201, the gate wiring 202 and the joint part 203.

The first insulating layer 204 is formed by patterning an insulating layer which is the single layer film or the multilayer film of the silicon nitride and/or the silicon oxide which were formed by using CVD etc. Patterning of the insulating layer is performed using the photolithography method etc.

A semiconductor layer 205 is formed by patterning an amorphous silicon (a-Si, n$^+$a-Si) film which formed on the first insulating film 204. The amorphous silicon film is formed by using CVD method etc., and is patterned by using the photolithography method etc.

On the semiconductor layer 205, a source electrode 206, source wiring 207, and a drain electrode 208 are formed.

The source electrode 206 and others are formed by patterning a metal film. The metal film forms the single layer film and/or the multilayer film, such as Chromium and ITO, by using the sputtering method, and is patterned by using the photolithography method etc.

After above mentioned processes, the gate wiring 202 and the source wiring 207 are formed, and a switching element of a TFT (thin film transistor) is formed in an area near a crossing of the gate wiring 202 and source wiring 207.

In the exemplary embodiment, although an inverse stagger type TFT is described as an example, a forward stagger type TFT is possible.

Next, a pixel electrode 209 is formed on the source electrode 206 or the like.

The pixel electrode 209 is formed by patterning a transparent conductive film (e.g. ITO) formed by a sputtering method. Patterning is performed by using the photolithography method.

A second insulating film 210 is formed on the pixel electrode 209.

The second insulating film 210 is formed by patterning a single layer film or a multilayer film of silicon nitride or silicon oxide formed by CVD method. Patterning is performed by using the photolithography method.

The second insulating film 210 in the exemplary embodiment is made of a silicon nitride of a single layer film having dielectric constant 6.4 and 0.32 μm of thickness.

Next, by opening an upper layer film including the second insulating film 210 and the first insulating film 204, a contact hole 211 for electrically connecting to a lower layer film like a joint part 203 is formed.

At that time, a contact hole for a terminal part acting as a junction point for a driving circuit, and the gate wiring 202 and the source wiring 207 can be formed simultaneously with the contact hole 211.

The terminal part is formed in an area in which a pixel is not formed in an edge area of the second substrate 200.

Next, a second common electrode 212 is formed on the second insulating film 210.

The second common electrode 212 is formed by patterning a metallic single layer or a multilayer film formed by a sputtering method (e.g. Chromium and ITO). Patterning is performed by using the photolithography method.

An electrode, such as a terminal part, can also be simultaneously formed at the time of formation of the second common electrode 212.

The second common electrode 212 includes an opening 213.

A plurality of openings 213 are formed according to a pixel size.

The width 214 of the opening 213 is 1 μm or more and 4 μm or less, and the width 213 of the non-opening is 1 μm or more and 6 μm or less The driving voltage becomes too high when the width 214 of the opening 213 is less than 1 μm. Therefore, it becomes difficult to design the LCD panel. When the width 214 of the opening 213 exceeds 4 μm, a vertical electric field becomes influential and luminance of the LCD panel decreases substantially.

When the width 215 of the non-opening is less than 1 μm, since the vertical electric field becomes influential, luminance decreases, and an image display also may become inhomogeneous. When the width 215 of the non-opening exceeds 6 μm, a design of an LCD panel becomes difficult since the driving voltage becomes too high.

Accordingly, in the exemplary embodiment, the width 214 of the opening 213 is 2 μm, and the width 215 of the non-opening is 3 μm.

Alignment films 120 and 220 composed of organic layers, for example, a polyimide, are formed on a top layer of the first substrate 100 and the second substrate 200.

By performing rubbing treatment to the alignment films 120 and 220, a liquid crystal mixture is oriented in the direction approximately parallel to the substrate.

The rubbing treatment is performed so that the liquid crystal mixture is set to be an antiparallel orientation with respect to an initial orientation direction 300 shown in FIG. 3 of the liquid crystal mixture. Further, the liquid crystal mixture may be set to be a parallel orientation to the orientation direction 300.

An angle between the initial orientation direction 300 of the liquid crystal mixture and a long direction 310 of the opening 213 of approximately rectangular shape in the second common electrode 212 preferably is 1 degree or more and 30 degrees or less.

When the angle is less than 1 degree, orientation of the liquid crystal mixture becomes inhomogeneous, and an image display also becomes inhomogeneously.

On the other hand, when the angle exceeds 30 degrees, luminance decreases substantially because change in an orientation direction of the liquid crystal mixture is too small. In the exemplary embodiment, the angle is 15 degrees.

Next, the first substrate 100 and second substrate 200 are arranged in parallel, keeping a fixed interval so that the alignment film 120 and the alignment film 220 face each other, and the liquid crystal mixture is filled up between the substrates to form the liquid crystal layer 400.

The liquid crystal mixture includes positive dielectric anisotropy, and the refractive index anisotropy $\Delta n$ thereof is 0.13.

A product ($\Delta n \times d$) of the refractive index anisotropy ($\Delta n$) of the liquid crystal mixture and the thickness (d) of the liquid crystal layer 400 is 400 nm or more and 1000 nm or less when a wavelength of an incident light is 589 nm. Thereby, luminance of the LCD panel improves substantially.

According to the exemplary embodiment, thickness d of the liquid crystal layer 400 is 4.0 µm, and the product ($\Delta n \times d$) is 520 nm.

Next, polarizers 130 and 230 composed of optical films are stuck on a face on the side of an incident light of the first substrate 100 (lower side of FIG. 4), and on a face on the side of emitting light of the second substrate 200 (upper side of FIG. 4), respectively.

When the polarizers 130 and 230 including a layered product of a polarizer and an optical compensation film are used, the homogeneity of an image display becomes still better.

At that time, the polarizer 130 and the polarizer 230 need to be stuck so that absorption axes thereof are approximately orthogonal. In the exemplary embodiment, the polarizer 130 stuck on the first substrate 100 is stuck so that the absorption axis thereof becomes in approximately parallel to the orientation direction 300 of the liquid crystal mixture.

However, the polarizer 130 may be stuck so that the absorption axis thereof is approximately orthogonal to the orientation direction 300 of the liquid crystal mixture.

In the exemplary embodiment, the first common electrode 103 and the second common electrode 212 electrically connect with each other, and electric potential of the common electrodes is given by the same signal.

The conduction of the first common electrode 103 and the second common electrode 212 is performed by connecting wiring lines drawn out from the first common electrode 103 and the second common electrode 212 with a conductive paste.

Since the wiring lines drawn out from the first common electrode 103 and the second common electrode 212 are connected with the driving circuits, electric potential of the first common electrode 103 and electric potential of the second common electrode 212 may be adjusted by forming a potential adjustment unit for adjusting a signal from the driving circuit.

As the potential adjustment unit, a variable resistor can be exemplified and the resistance value thereof is set in high display stability state by minimizing a flicker level.

Thus, although the first common electrode and the second common electrode 212 are electrically connected with each other, and the electric potential is given to the electrodes by the same signal, electric potential of the electrodes may be individually adjusted without conduction between the electrodes.

Next, operation of the LCD panel of the present invention will be described.

Figure 5:
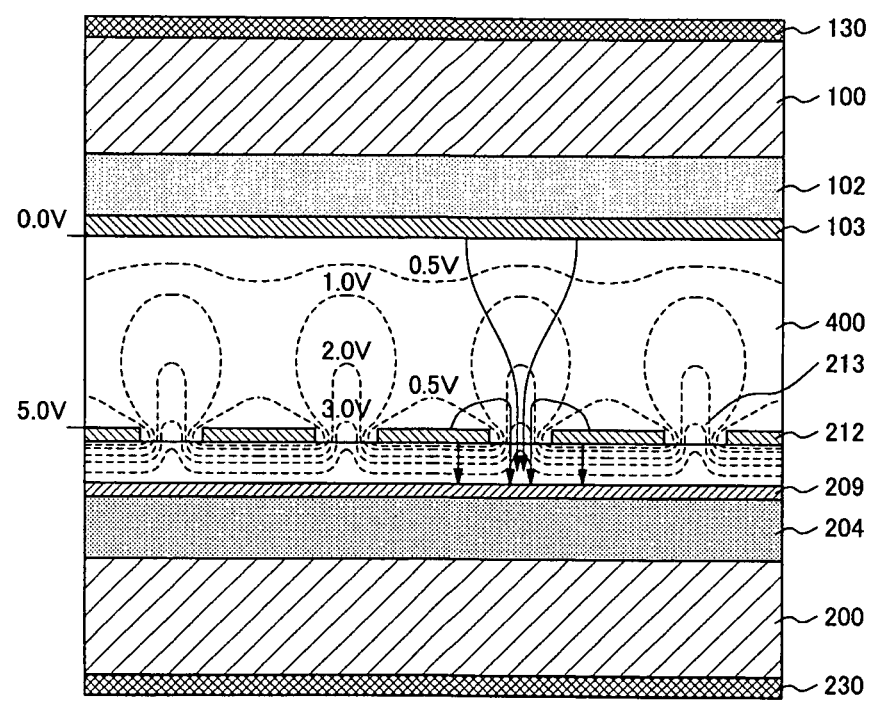
FIG. 5 is a chart showing electric potential distribution in a cross sectional view along B-B' line of FIG. 3 according to the second exemplary embodiment of the present invention.

FIG. 5 is a drawing showing potential distribution in a cross sectional view along a B-B' line of FIG. 3.

Voltages are applied to the first common electrode 103 and second common electrode 212 so that each of the electrodes includes electric potential different from that of the pixel electrode 209.

For example, the electric potential of the first common electrode 103 and the second common electrode 212 is set as the same electric potential, and the electric potential of the pixel electrode 209 is set so as to include an electric potential difference of 5.0 V with respect to electric potential of the first common electrode 103.

In FIG. 5, the dotted lines indicate main equipotential lines and the arrows indicate the main electric fields.

The equipotential line is derived from simulation result and numerals indicate the electric potential.

As shown in FIG. 5, in an area near the opening 213 of the second common electrode 212, the equipotential lines of 0.5 V to 4 V are crowded.

Such crowding occurs because electric potential difference is given between the second common electrode 212 and the pixel electrode 209 and further between the first common electrode 103 and the pixel electrode 209.

Accordingly, if the electric potential differences are adjusted, the orientation direction of the liquid crystal mixture can be changed mainly in the face parallel to the substrate.

Therefore, intensity of a transmitted light that passes through the LCD panel is controlled, and image display with high contrast can be obtained.

If potential adjustment of the first common electrode 103 and the second common electrode 212 is performed, display with a minimized flicker level is achieved and stable image display can be realized.

Next, a third exemplary embodiment of the present invention will be described.

Regarding the same configuration as the above-mentioned exemplary embodiments, description is optionally omitted using same symbol.

The exemplary embodiment is related with a configuration which includes a changed width of the opening 213 of the second common electrode 212.

Figure 6:
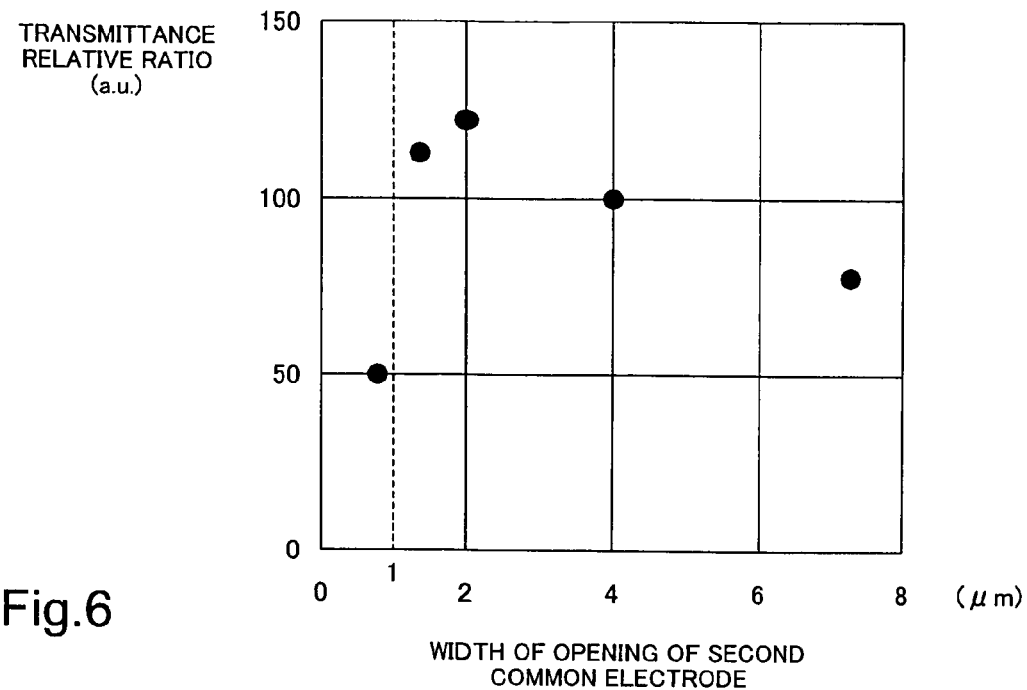
FIG. 6 is a graph showing a relation between a width in an opening of a second common electrode and a transmittance relative value according to a third exemplary embodiment of the present invention.

FIG. 6 shows an experimental result which illustrates a transmittance relative ratio with respect to a width of the opening 213.

In the experiment, widths of the opening 213 of the second common electrode 212 are 0.8 µm, 1.4 µm, 2.0 µm, 4.0 µm, and 7.4 µm.

When the width of the opening 213 is 0.8 µm and a driving voltage is increased, luminance is largely shifted toward a higher value. However, when the width of the opening 213 is 7.4 µm, luminance does not exceed a predetermined value even if the driving voltage is increased.

Figure 7:
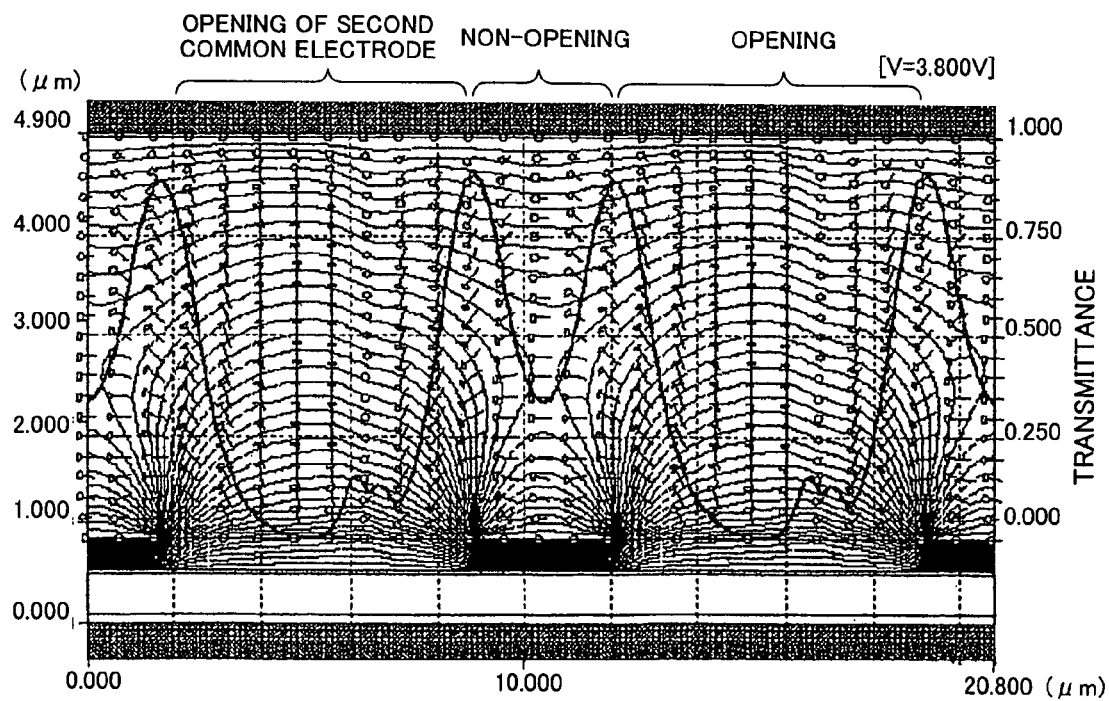
FIG. 7 is a chart showing orientation direction of a liquid crystal mixture when a width in the opening of the second common electrode is widened according to the third exemplary embodiment of the present invention.
Figure 8:
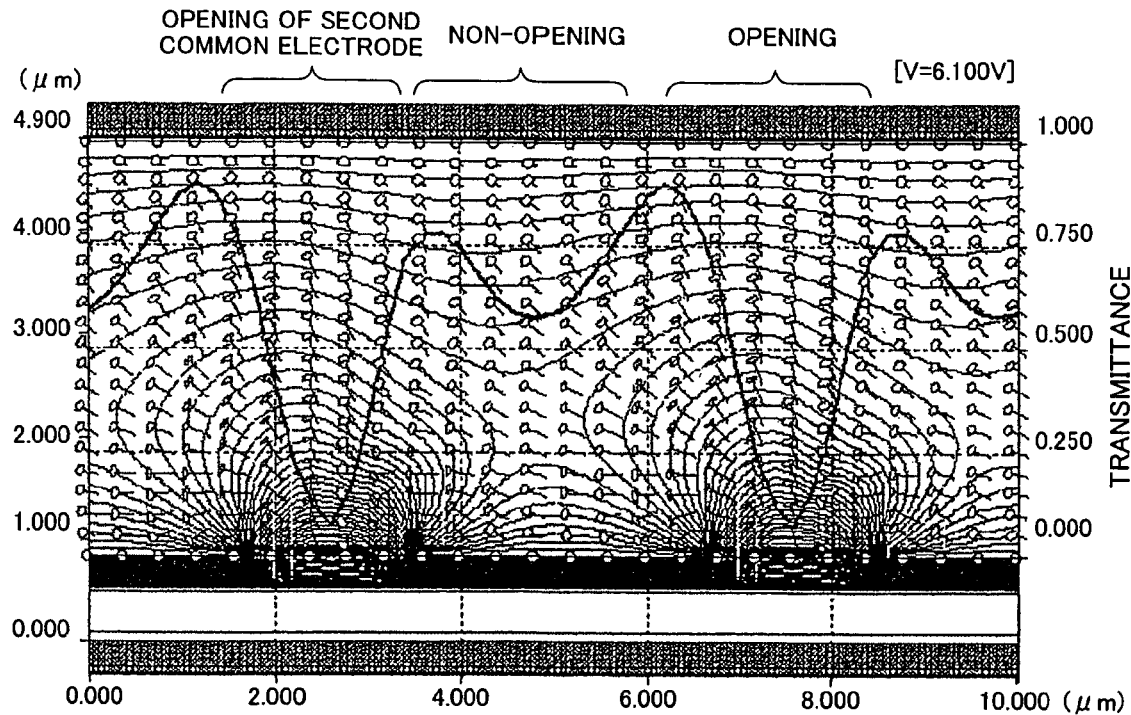
FIG. 8 is a chart showing orientation direction of a liquid crystal mixture when a width in the opening of the second common electrode is narrowed according to the third exemplary embodiment of the present invention.

Results of a simulation performed to find out the reason why the luminance does not become larger than the predetermined value even if the driving voltage increases are shown in FIG. 7 and FIG. 8.

Nail-like symbols in FIG. 7 and FIG. 8 indicate an orientation direction of the liquid crystal mixture.

The simulation is performed on conditions that the electric potential in which the luminance becomes a peak value is applied to each electrode.

FIG. 7 illustrates distribution of the equipotential line on the condition that the width of the opening 213 is 7.4 µm, and FIG. 8 shows distribution of the equipotential line on the condition that the width of the opening 213 is 2.0 µm.

When the orientation directions of the liquid crystal mixture of the opening 213 shown in FIG. 7 and FIG. 8 are compared, the nail-like symbols shown in FIG. 7 are arranged in a nearly vertical direction with respect to the substrate compared with the nail-like symbols shown in FIG. 8.

Because the width (7.4 µm) of the opening 213 shown in FIG. 7 is larger than the width (2.0 µm) of the opening 213 shown in FIG. 8, intensity of a vertical electric field (electric field perpendicular to the substrate) generated between the first common electrode 103 and pixel electrode 209 became large.

From the above result, an LCD device with an bright image display can be provided by setting the width of the opening 213 as 1 µm or more and 4 µm or less.

Next, a fourth exemplary embodiment of the present invention will be described.

Regarding the same configuration as the above-mentioned exemplary embodiments, description is optionally omitted using same symbol.

The exemplary embodiment is related with a configuration which includes a changed width of the non-opening of the second common electrode 212.

Figure 9:
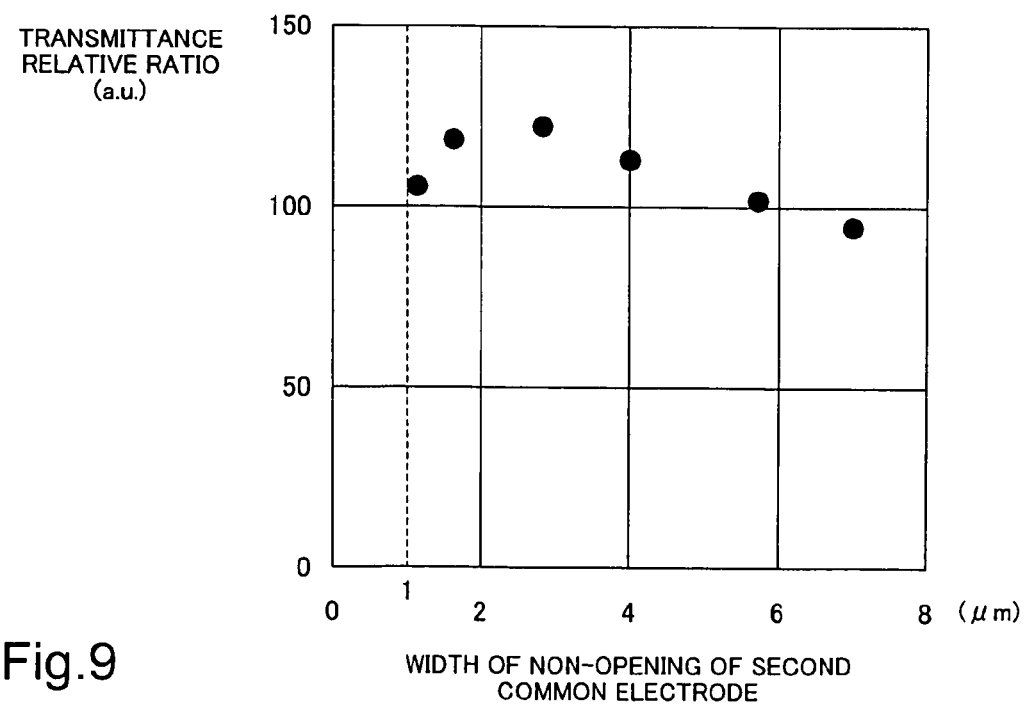
FIG. 9 is a graph showing a relation between a width in an non-opening of a second common electrode and a transmittance relative value according to a fourth exemplary embodiment of the present invention.

FIG. 9 shows an experimental result which shows a transmittance relative ratio with respect to the width of the non-opening.

In the experiment, the widths of the non-opening of the second common electrode 212 are 1.0 µm, 1.6 µm, 4.0 µm, 5.8 µm and 7.0 µm.

When the width of the non-opening is equal to or less than 1.0 µm, or equal to or more than 6.0 µm, the transmittance relative ratio is less than 100.

And when the width of the non-opening is 1 µm or more and 6 µm or less, the transmittance relative ratio becomes greater than 100.

Therefore, when the width of the non-opening is 1 µm or more and 6 µm or less, an LCD device having an bright image display can be provided.

Next, a fifth exemplary embodiment of the present invention will be described.

Regarding the same configuration as the above-mentioned exemplary embodiments, description is optionally omitted using same symbol.

The exemplary embodiment is related with a configuration in which an angle between the initial orientation direction of the liquid crystal mixture and the long direction of the opening 213 of the second common electrode 212 is changed.

Figure 10:
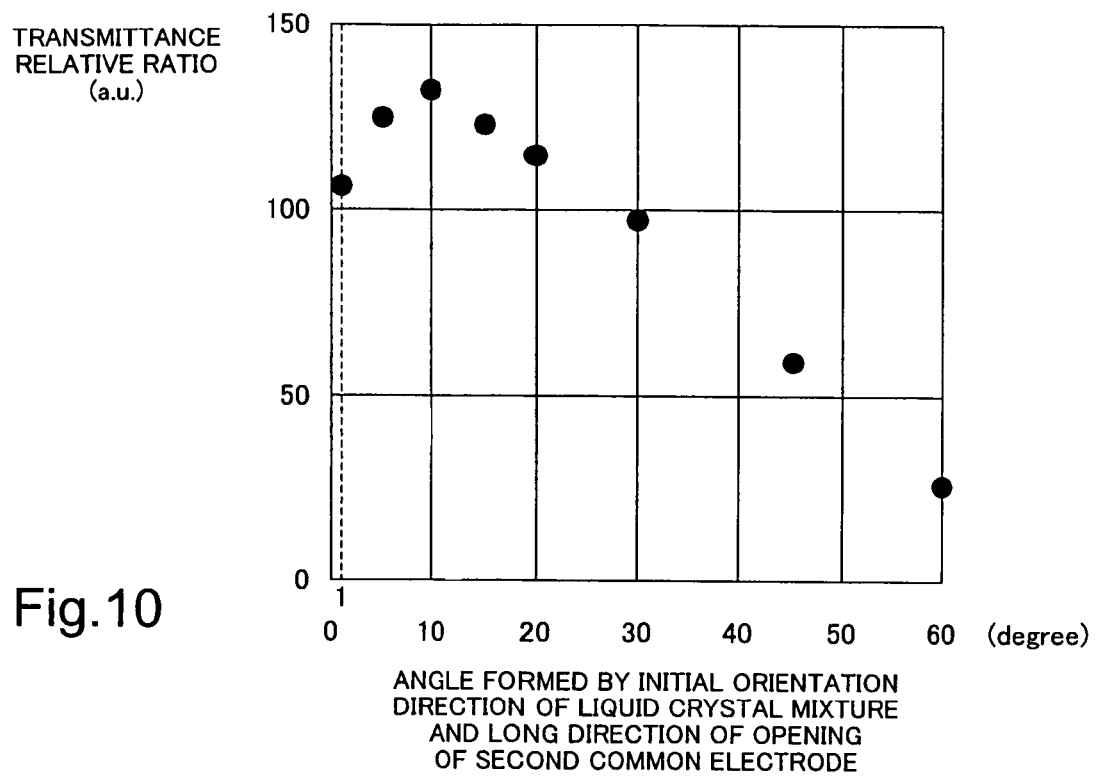
FIG. 10 is a graph showing a relation of an angle formed by an initial orientation direction of a liquid crystal mixture and a long direction of an opening of a second common electrode, and a transmittance relative value according to a fifth exemplary embodiment of the present invention.

FIG. 10 shows an experimental result which shows a relation between the angles and the transmittance relative ratio relevant with respect to luminance.

In the experiment, the angles between the orientation direction and the long direction are 1 degree, 5 degrees, 10 degrees, 15 degrees, 20 degrees, 30 degrees, 45 degrees, and 60 degrees.

A direction of orientation process and a direction of an orientation process treatment trace on the second substrate 200 approximately accord with an initial orientation direction of the liquid crystal mixture.

Accordingly, the initial orientation direction of the liquid crystal mixture can be confirmed, if the direction of orientation process and the direction of the orientation process trace on the second substrate 200 are examined.

It may be confirmed by performing retardation measurement using a commercial measuring instrument (for example, RETS device by Otsuka Electronics Co., Ltd.).

FIG. 10 shows that an LCD device with a bright image display can be provided, when the angle between the initial orientation direction and the long direction of the opening 213 is 1 degree or more and 30 degrees or less.

Next, a sixth exemplary embodiment of the present invention will be described.

Regarding the same configuration as the above-mentioned exemplary embodiment, description is optionally omitted using same symbol.

The exemplary embodiment relates to a configuration in which the thickness of the liquid crystal layer 400 is changed.

Figure 11:
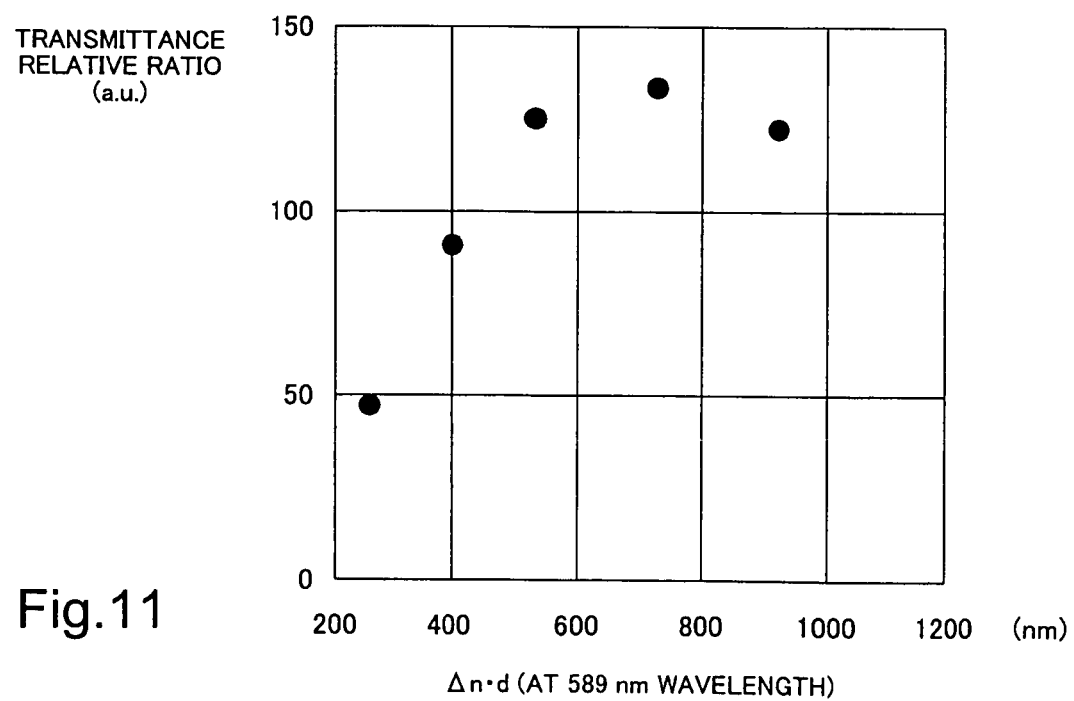
FIG. 11 is a graph showing a relation of Δn×d and a transmittance relative value according to a sixth exemplary embodiment of the present invention.

FIG. 11 is an experimental result which shows the transmittance relative ratio with respect to the thickness of the liquid crystal layer 400.

A horizontal axis of FIG. 11 is a product ($\Delta n \times d$) of the refractive index anisotropy ($\Delta n$) of the liquid crystal mixture and thickness (d) of the liquid crystal layer 400.

The retardation ($\Delta n \times d$) is measured using the commercial measuring instrument (for example, RETS device by Otsuka Electronics Co. Ltd.).

In the experiment, the thicknesses of the liquid crystal layer 400 are 2.0 µm, 3.0 µm, 5.5 µm and 7.0 µm.

From FIG. 11, it is found that an LCD device with a bright image display can be provided, if the retardation ($\Delta n \times d$) is 400 nm or more and 1000 nm or less with respect to a light with a wavelength of 589 nm.

Next, a seventh exemplary embodiment of the present invention will be described.

Regarding the same configuration as the above-mentioned exemplary embodiment, description is optionally omitted using same symbol.

This exemplary embodiment relates to a configuration in which the thickness of the second insulating film 210 is changed.

Figure 12:
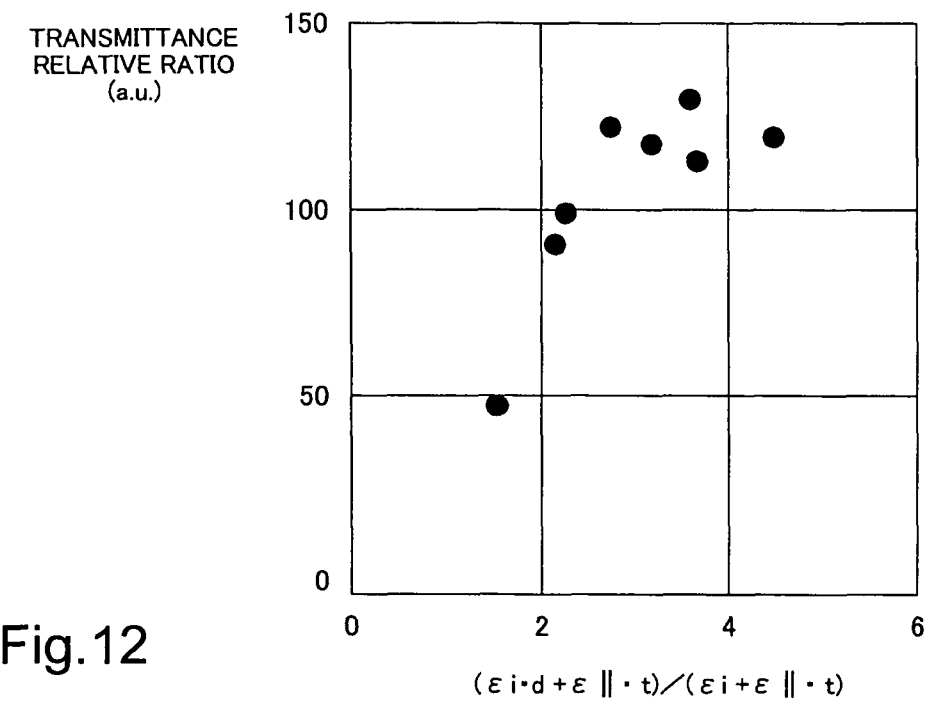
FIG. 12 is a graph showing a relation of $(\in i \times d + \in \| \times t)/(\in i + \in \| \times t)$ and a transmittance relative value according to a seventh exemplary embodiment of the present invention.

FIG. 12 is an experimental result which shows the transmittance relative ratio with respect to the thickness of the second insulating film 210.

In the experiment, the thicknesses of the second insulating film 210 are 0.05 µm, 0.16 µm and 0.64 µm.

A horizontal axis of FIG. 12 is the value defined by an expression (1), where $\in_i$ is dielectric constant of the second insulating film 210, t is the thickness of the second insulating film 210, $\in_\parallel$ is the dielectric constant (parallel direction) of the liquid crystal mixture, and d is a thickness of the liquid crystal layer 400.

$$(\in_i \times d + \in_\parallel \times t)/(\in_i + \in_\parallel \times t) \qquad (1)$$

The expression (1) simplifies Cv/Cp of a ratio of capacity Cv and capacity Cp.

The capacity Cv is the capacity of a electric circuit which reaches the second common electrode 212 through the second insulating film 210 and the liquid crystal layer 400 from the pixel electrode 209, and the capacity Cp is the capacity of the electric circuit which reaches the first common electrode 103 through the second insulating film 210 and the liquid crystal layer 400 from the pixel electrode 209.

According to FIG. 12, it is found that an LCD device with a bright image display can be provided when the value of the expression (1) is no less than 2, that is, $(\in_i \times d + \in \| \times t)/(\in_i + \in \| \times t) \geq 2$.

Next, an eighth exemplary embodiment of the present invention will be described.

Regarding the same configuration as the above-mentioned exemplary embodiments, description is optionally omitted using same symbol.

The exemplary embodiment relates to a configuration in which the position of the pixel electrode 209 is changed.

Figure 13:
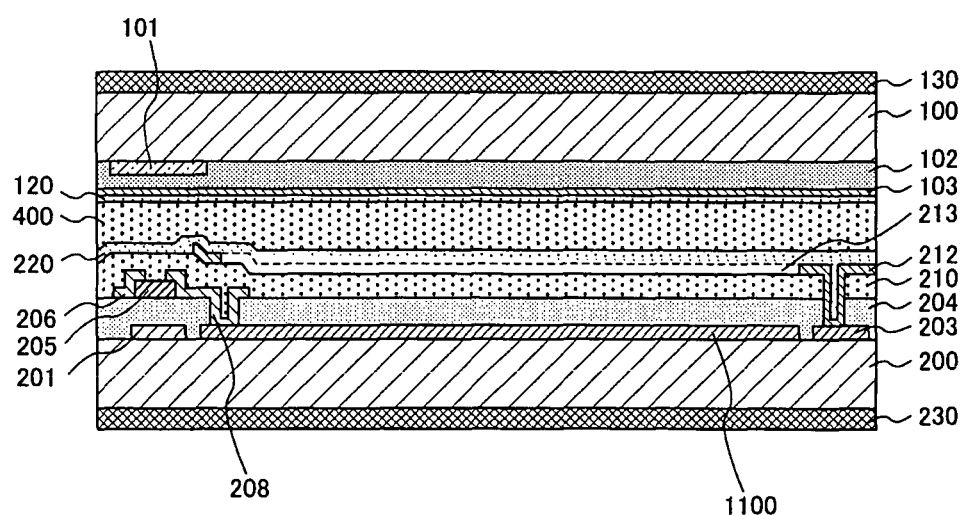
FIG. 13 is a cross sectional view showing a configuration of one pixel of an LCD panel according to an eighth exemplary embodiment of the present invention.

Although the pixel electrode 209 according to the above-mentioned exemplary embodiments is provided on the first insulating film 204, a pixel electrode 1100 according to the exemplary embodiment is formed directly on the second substrate 200, as shown in FIG. 13.

Specifically, a gate electrode 201 is formed by 5 patterning a single layer film of metal (e.g. Chromium) or a multilayer film of metal (e.g. Chromium and ITO) formed by a sputtering method on the second substrate 200. Patterning is performed by using the photolithography method.

At that time, a gate line 202 and a joint part 203 are formed simultaneously.

After that, a transparent conductive film (e.g. ITO) is formed by a sputtering method or the like, and the film is patterned by a photolithography method, and the pixel electrode 1100 is formed.

The pixel electrode 1100 may be formed ahead of the gate electrode 201 or like.

Next, a film including a single layer film or a multilayer film made of silicon nitride and/or silicon oxide is formed by a CVD method, and the film is patterned by a photolithography method, and the first insulating film 204 is formed.

An amorphous silicon (a-Si, n+a-Si) is formed on an upper layer of the first insulating film 204 by a CVD method, and the film is patterned by a photolithography method, and a semiconductor layer 205 is formed.

And a contact hole for electrically connecting the pixel electrode 1100 with a drain electrode 208 is formed by a photolithography method.

A film including a single layer or a multilayer film of metal (e.g. Chromium, ITO) is formed by a sputtering method after formation of the contact hole, and the film is patterned by a photolithography method, and a source 5 electrode 206, a source wiring 207 and a drain electrode 208 are formed.

A single layer film or multilayer film made of silicon nitride and/or silicon oxide is formed on the upper layer of a source electrode 206 by a CVD method, and the film is patterned by a photolithography method, and a second insulating film 210 is formed.

As mentioned above, other processes except for the process to change the formation position of the pixel electrode 1100 and the process to connect the pixel electrode 209 with the drain electrode 208 are the same as that in the above-mentioned exemplary embodiments.

Similarly, the formation position of the second common electrode 212 can also be changed.

A specific formation position of the second common electrode 2 12 is a position on the second insulating film 210 or a position on the first insulating film 204 as shown in FIG. 13.

By using such a configuration, an LCD device with a bright image display can be provided.

Next, a ninth exemplary embodiment of the present invention will be described. Regarding the same configuration as the above-mentioned exemplary embodiments, description is optionally omitted using same symbol.

The exemplary embodiment is related with a configuration in which the initial orientation direction of the liquid crystal mixture and the pattern shape of the opening of the second common electrode 212 are changed in the above-mentioned exemplary embodiments.

Figure 14:
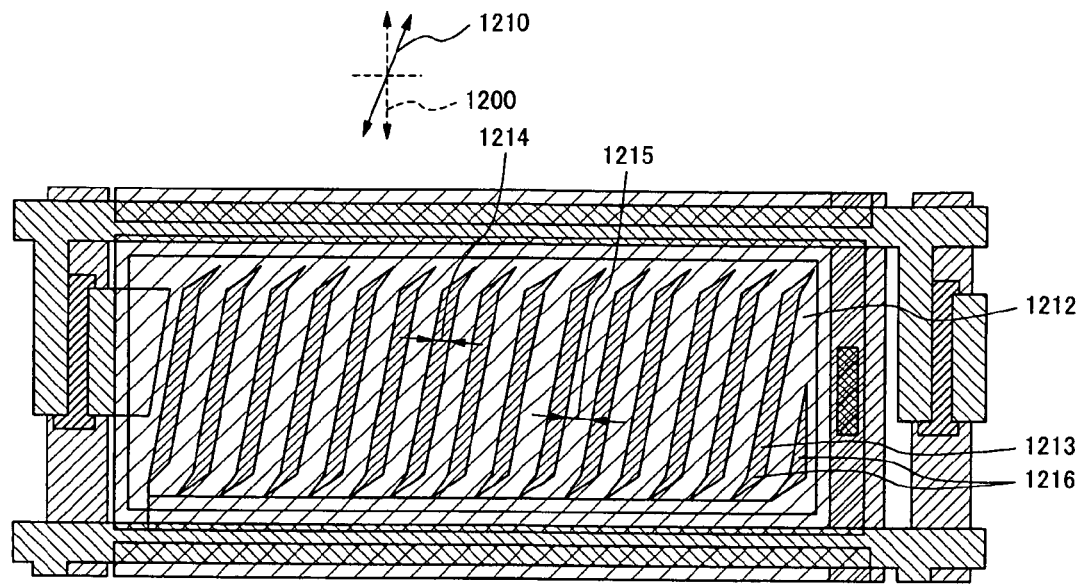
FIG. 14 is a plan view showing a configuration of one pixel of an LCD panel according to a ninth exemplary embodiment of the present invention.

FIG. 14 is a plan view corresponding to one pixel of an LCD device.

The second common electrode 1212 is formed on the second substrate 200, and a plurality of the openings 1213 thereof are provided appropriately considering the size or the like of the pixel.

At that time, a long direction 1210 of the opening 1213 is different from a long direction 310 of the opening 213 in the first exemplary embodiment.

For example, although the long direction 310 of the opening 213 in the first exemplary embodiments is arranged in a direction of right and left of the paper, the long direction 1210 of the opening 1213 in the exemplary embodiment is arranged in a direction of the upper and the lower sides of the paper.

The width 1214 of the opening is 1 μm or more and 4 μm or less, and the width 1215 of the non-opening is 1 μm or more and 6 μm or less.

According to the exemplary embodiment, both the width 1214 of the opening and the width 1215 of the non-opening are 3 μm.

When the long direction 1210 of the opening 1213 is arranged as shown in FIG. 14, the initial orientation direction 1200 of the liquid crystal mixture according to rubbing process is arranged in a different direction from the orientation direction 300 shown in FIG. 3.

However, the angle between the initial orientation direction 1200 of the liquid crystal mixture and the long direction 1210 of the opening 1213 is 1 degree or more and 30 degree or less in view of improving a view angle characteristic.

In the exemplary embodiment, the rubbing treatment is performed so that the orientation direction 1200 and the long direction 1210 may become 10 degrees.

The rubbing treatment is performed so that an orientation anti-parallel to an initial orientation direction 1200 of the liquid crystal mixture is formed, but it can be also performed so that an orientation parallel to the orientation direction 1200 thereof is formed.

Thus, as long as the angle between the initial orientation direction 1200 of the liquid crystal mixture and the long direction 1210 of the opening 1213 is 1 degree or more and 30 degrees or less, the initial orientation direction 1200 of the liquid crystal mixture may be set optionally.

In an edge area of an opening 1213 where a predetermined width 1214 of an opening cannot be formed, it is preferable that the orientation direction of the liquid crystal mixture which responds to the electric field in the edge area accords with an orientation direction of the liquid crystal mixture which responds to the electric field in other areas, by forming an auxiliary opening 1216 as shown in FIG. 14.

Although the second common electrode 1212 may be independently formed for every pixel, the second common electrode 1212 that connects neighboring pixels may be formed.

Thereby, it is not necessary to apply electric potential to the second common electrode 1212 for every pixel, and a drive of a display panel can be driven easily.

By adopting the configuration described above, an LCD device with a bright image display can be provided.

Next, a tenth exemplary embodiment of the present invention will be described. Regarding the same configuration as the above-mentioned exemplary embodiment, description is optionally omitted using same symbol.

The exemplary embodiment is related with a configuration in which the initial orientation direction 1300 of the liquid crystal mixture and shape of the second common electrode 1312 are changed.

Figure 15:
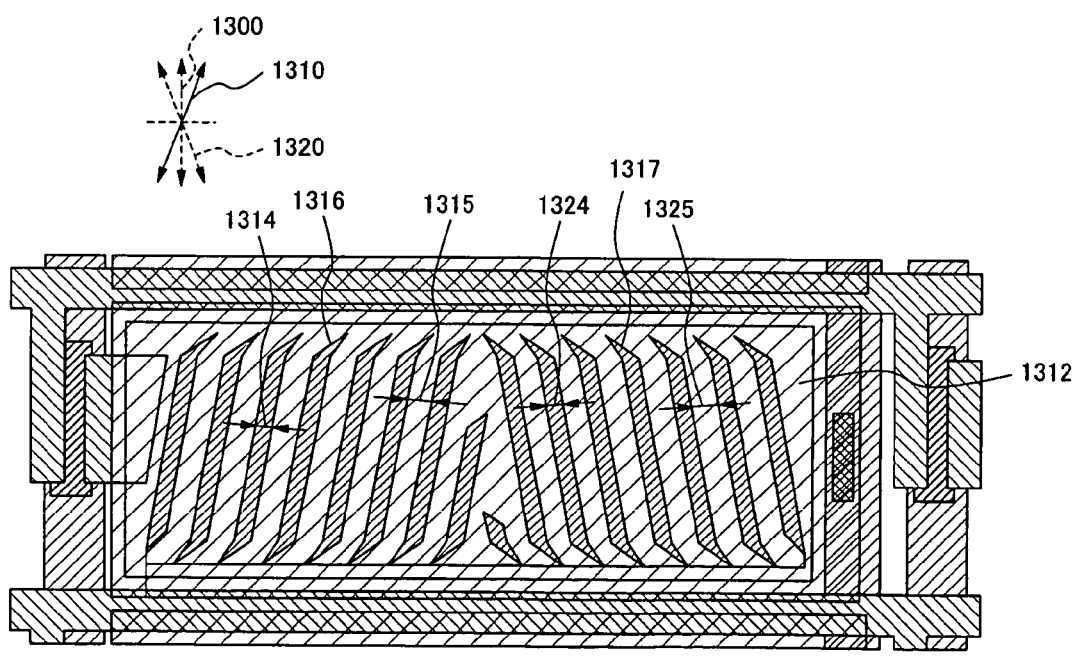
FIG. 15 is a plan view showing a configuration of one pixel of an LCD panel according to a tenth exemplary embodiment of the present invention.

That is, the second common electrode 1312 includes the first opening 1316 with the first long direction 1310, and the second opening 1317 with the second long direction 1320 as shown in FIG. 15.

FIG. 15 is a plan view corresponding to one pixel of the LCD device.

Two or more of the first openings 1316 and the second openings 1317 of the common electrode 1312 formed on the second substrate 200 are provided suitably considering a pixel size, etc., and the first long direction 1310 and the second long direction 1320 are different from each other.

The width 1314 of the first opening 1316 and the width 1324 of the second opening 1317 is 1 μm or more and 4 μm or less, and the width 1315 of the first non-opening and the width 1325 of the second non-opening are 1 μm or more and 6 μm or less.

According to the exemplary embodiment, each of the widths of the first opening 1316 and the second opening 1317 is 3 μm, and each of the widths of the first non-opening and the second non-opening is 3 μm.

The initial orientation direction of the liquid crystal mixture includes an intermediate orientation direction 1300 between the first long direction 1310 and the second long direction 1320 by a rubbing process.

However, the angle between the first long direction 1310 or the second long direction 1320, and the initial orientation direction 1300 of the liquid crystal mixture is 1 degree or more and 30 degrees or less.

According to the exemplary embodiment, the angles are 10 degrees respectively.

The rubbing treatment is performed so that the initial orientation direction of the liquid crystal mixture is arranged to be an anti-parallel orientation, but the rubbing treatment can be also performed so that it is arranged to be a parallel orientation.

As mentioned above, when a plurality of the first long directions 1310 and the second long direction 1320 whose long directions differ in one pixel are arranged, an image display by which luminance and tone in each pixel can be equalized, and the LCD device provided with a highly homogeneous view angle can be provided.

The angle between the initial orientation direction 1300 of the liquid crystal mixture and the first long direction 1310 is 10 degrees in a clockwise direction and the angle between the orientation direction 1300 and the second long direction 1320 is 10 degrees in a counterclockwise direction. Therefore, an LCD panel with a highly homogeneous view angle can be provided.

Since the angles between the first long direction 1310 or the second long direction 1320, and an orientation direction 1300 are set in the same value, luminance in the first opening 1316 and the second opening 1317 changes similarly. Therefore, the LCD panel with a highly homogeneous view angle can be provided.

Next, an eleventh exemplary embodiment of the present invention will be described. Regarding the same configuration as the above-mentioned exemplary embodiments, description is optionally omitted using same symbol.

Figure 16:
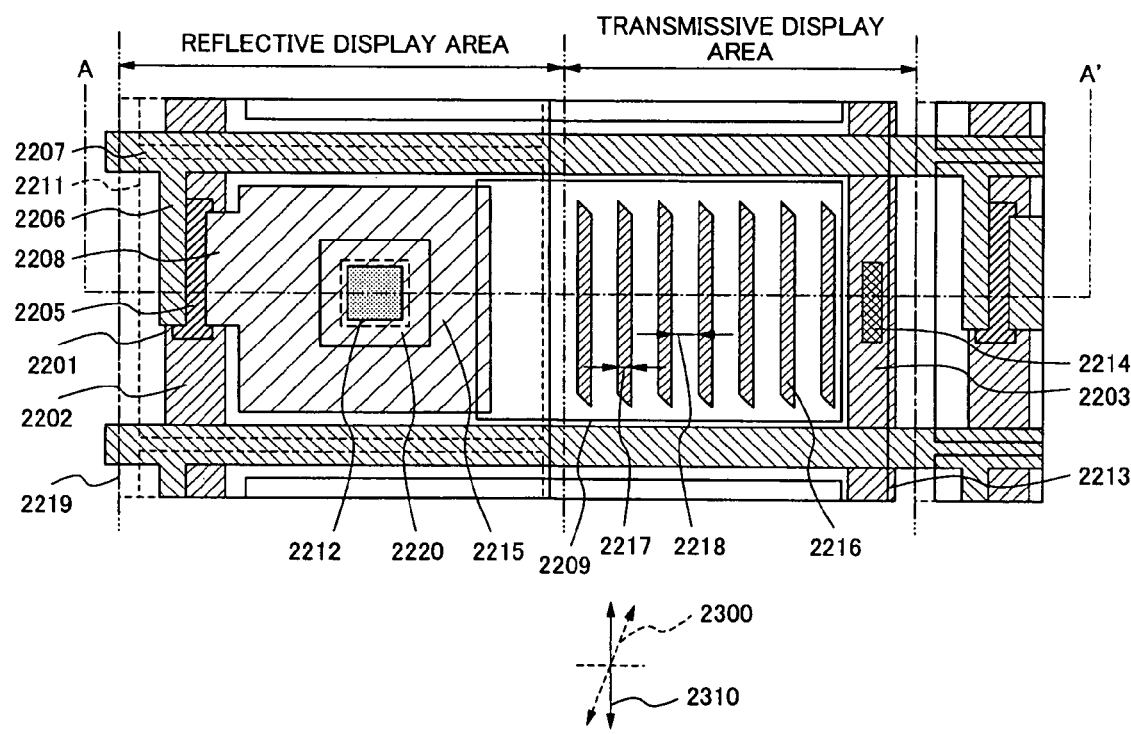
FIG. 16 is a plan view showing a configuration of one pixel of an LCD panel according to an eleventh exemplary embodiment of the present invention.
Figure 17:
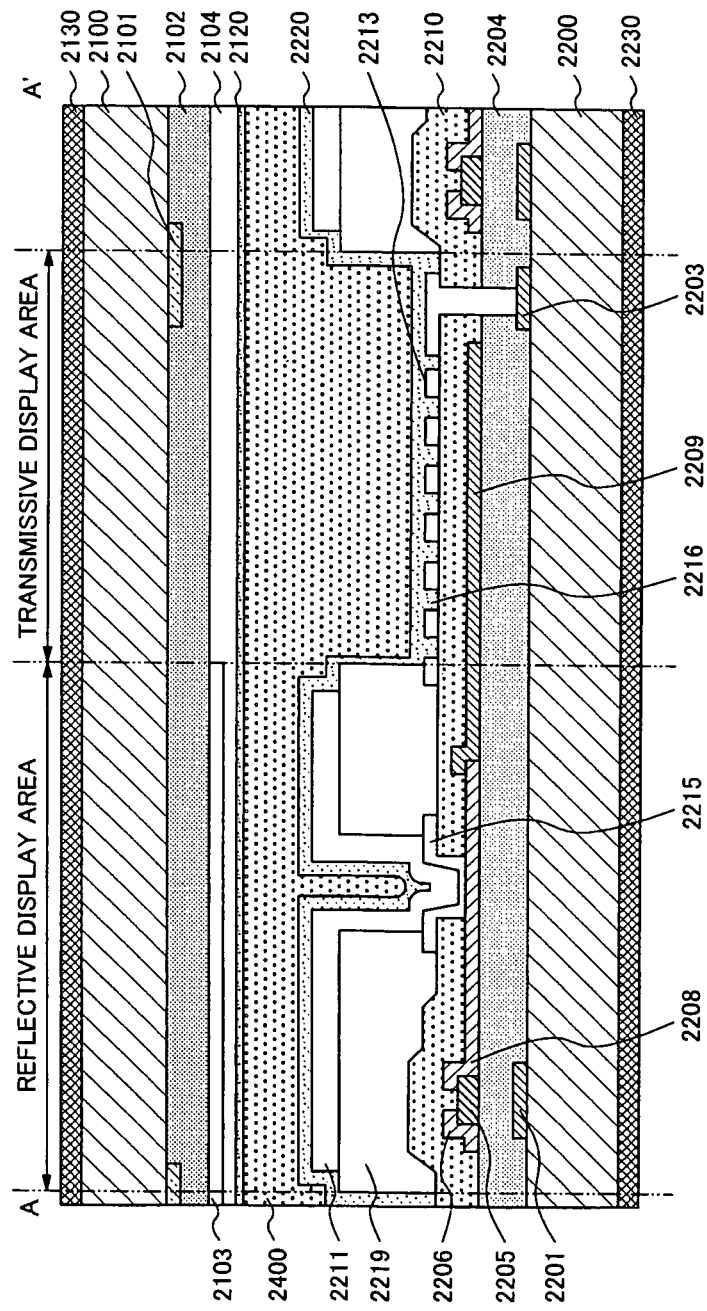
FIG. 17 is a cross sectional view along an A-A' line of FIG. 16 according to the eleventh exemplary embodiment of the present invention.

FIG. 16 is a partial cross section of an LCD panel according to the present invention, and FIG. 17 is a cross sectional view along an A-A' line of FIG. 16.

The exemplary embodiment is related with a semi-transmissive LCD panel provided with a transmissive display area displaying an image according to a transmitted light and a reflective display area displaying an image by a reflected light in one pixel.

In the transmissive display area, orientation directions of a liquid crystal mixture changes mainly in a face parallel to a substrate, and transmission display having a wide viewing angle are realized.

In the reflective display area, an orientation direction of a liquid crystal mixture changes mainly in a face vertical to the substrate, and the reflective display is realized.

The LCD panel concerning the exemplary embodiment includes a first transparent substrate 2100 and a second substrate 2200 (e.g. glass). A liquid crystal mixture with positive dielectric anisotropy is sandwiched between the substrates.

A light shielding film 2101 including an opaque metal (e.g. Chromium) or an organic film (e.g. acrylic fiber containing carbon) is provided on the first substrate 2100, and a color layer 2102 for performing color displays is further provided thereon.

A ½ wavelength plate 2103 is formed on the color layer 2102 in the reflective display area.

As the ½ wavelength plate 2103, a wavelength plate formed by laminating two kinds of ½ wavelength plates each having a different arrangement angle can be used.

The first common electrode 2104 including a transparent conductive film (e.g. ITO) is formed by a sputtering method after forming the ½ wavelength plate 2103.

The first common electrode 2104 is formed by patterning a conductive film with photolithography method if needed.

According to the exemplary embodiment, the conductive film is not patterned and the first common electrode 2104 common to the transmissive display area and the reflective display area is formed.

A metallic single layer (e.g. Chromium) or a film including metallic multilayer film (e.g. Chromium, ITO) is formed by a sputtering method on the second substrate 2200, and the film is patterned by a photolithography method to form a gate electrode 2201 and a gate line 2202.

If a joint part 2203 and the gate electrode 2201 are simultaneously formed when a lower resistance material (e.g. Chromium) rather than ITO(s) is used, the number of processes is reduced.

Next, a film composed of a single layer film or a multilayer film made of silicon nitride or silicon oxide is formed with a CVD method, a first insulating film 2204 is formed by patterning the film using photolithography method.

A film including amorphous silicon (a-Si, n⁺a-Si) is formed on an upper layer of the first insulating film 2204 by a CVD method, and the film is patterned by a photolithography method to form a semiconductor layer 2205.

A film including a single layer or a multilayer film made of a metal (Chromium, ITO) is formed on the semiconductor layer 2205 by a sputtering method, and the film is patterned by a photolithography method to form a source electrode 2206, a source wiring 2207 and a drain electrode 2208.

The gate wiring 2202 and the source wiring 2207 are formed by the process hitherto, and a switching element is formed in an area near the crossing of lines of the wiring above described.

Next, a transparent conductive film (ITO) is formed by a sputtering method or the like, and the film is patterned by a photolithography method to form a first pixel electrode 2209.

A single layer film or multilayer film made of silicon nitride or silicon oxide is formed on an upper layer of the first pixel electrode 2209 by a CVD method, and the film is patterned by a photolithography method to form a second insulating film 2210.

The second insulating film 2210 in the exemplary embodiment is a single layer film made of silicon nitride in which dielectric constant is 6.4 and a thickness is 0.32 μm.

In order to electrically connect the second pixel electrode 2211 and the first pixel electrode 2209 in a reflective display area mentioned below, a first contact hole 2212 is formed.

In order to electrically connect a second common electrode 2213 and a joint part 2203 mentioned below, a second contact hole 2214 is formed.

Since the gate wiring 2202 is connected with a driving circuit via a terminal part formed in an edge area of a display area, a contact hole for connecting the gate wiring 2202 with the terminal part can be formed simultaneously with the second contact hole 2214.

Next, a film including transparent conductive film (e.g. ITO) is formed by a sputtering method, and the film is patterned using a photolithography method to form the second common electrode 2213.

In order to electrically connect the first pixel electrode 2209 and the second pixel electrode 2211, a conduction interlayer 2215 with an area larger than the first contact hole 2212 can be formed simultaneously with formation of the second common electrode 2213.

The terminal part or the like can be formed simultaneously with the second common electrode 2213.

At that time, the second common electrode 2213 formed in the transmissive display area includes at least an opening 2216.

A plurality of openings 2216 are formed in consideration of a size of the pixel.

The width 2217 of the opening is 1 μm or more and 4 μm or less, and the width of the non-opening is 1 μm or more and 6 μm or less.

Because the driving voltage becomes too high when the width 2217 of the opening is less than 1 μm, a design of an LCD panel becomes difficult.

On the other hand, because the vertical electric field becomes influential when the width 2217 of the opening exceeds 4 μm, luminance of an LCD panel decreases substantially.

Because influence of the vertical electric field becomes large when the width 2218 of the non-opening is less than 1 μm, luminance of the LCD panel decreases substantially, and an image display also becomes inhomogeneous.

On the other hand, because the driving voltage becomes too high when the width 2218 of the non-opening exceeds 6 μm, a design of an LCD panel becomes difficult.

According to the exemplary embodiment, the width 2217 of the opening is 2 μm, and the width 2218 of the non-opening is 3 μm.

Next, by a sputtering method, a film including a single layer film or a multilayer film made of organic film (e.g. acrylic resin) is formed in all areas in the reflective display area or a partial area therein, and the film is patterned by a photolithography method to form a third insulating film 2219.

The third insulating film 2219 is formed so that the third insulating film 2219 overlaps with the second common electrode 2213 in a boundary section of the reflective display area and the transmissive display area.

A third contact hole 2220 for electrically connecting the first pixel electrode 2209 and the second pixel electrode 2211 is formed simultaneously.

Next, the second pixel electrode 2211 is formed.

A film made of conductive material which reflects lights (e.g. aluminum alloy) is formed using a sputtering method, and the film is patterned with photolithography method to form the second pixel electrode 2211.

In FIG. 17, although a case where surfaces of the third insulating film 2219 and the second pixel electrode 2211 is flat is shown, shape of the surface of the third insulating film 2219 or the second pixel electrode 2211 may be irregular so that reflection by the second pixel electrode 2211 becomes scattered reflection.

Although the switching element on the second substrate 2200 is the inverted-stagger type TFT according to the exemplary embodiment, a forward stagger type TFT can be also used.

Each of alignment films 2120 and 2220 composed of organic layers (e.g. polyimide) is formed on the top layer of the first substrate 2100 and the second substrate 2200, respectively, and an orientation process is performed to the alignment films 2120 and 2220.

According to the exemplary embodiment, using a polyimide film as alignment films 2120 and 2220, rubbing process is performed to the polyimide film so that the film includes an orientation antiparallel to an initial orientation direction 2300 of the liquid crystal mixture.

In order to homogenize the liquid crystal molecular orientation in the reflective display area, the antiparallel orientation is formed, and an orientation control means is not limited to rubbing process.

Regarding the antiparallel orientation, two setups from which a direction differs 180 degrees can be considered from the direction of an inclination of liquid crystal molecular orientation to the substrate surface.

When the second common electrode 2213 and the third insulating film 2219 are overlapped at an area adjacent to the boundary of the reflective display area and the transmissive display area like the exemplary embodiment, any one of above-mentioned setups may be selected.

The reason is because the liquid crystal molecular orientation characteristic of the transmissive display area is stabilized because the second common electrode 2213 can be formed at the area adjacent to the boundary section of the transmissive display area.

The angle between the initial orientation direction 2300 of the liquid crystal mixture and the long direction 2310 of the opening of the second common electrode 2213 is 1 degree or more and 30 degree or less.

Because an orientation state of the liquid crystal mixture becomes inhomogeneous easily when the angle is less than 1 degree, an image display becomes inhomogeneous easily.

On the other hand, because a change in orientation direction of the liquid crystal mixture is too small when the angle exceeds 30 degrees, luminance decreases substantially.

According to the exemplary embodiment, rubbing process is performed so that the angle becomes 15 degrees.

Thus, while oppositely arranging an alignment film 2120 of the first substrate 2100 and an alignment film 2220 of the second substrate 2200 on which orientation process is performed, the first substrate 2100 and the second substrate 2200 is arranged in parallel with each other with a regular interval, and a liquid crystal layer 2400 is formed by arranging a liquid crystal mixture between the substrates.

The liquid crystal mixture above mentioned includes positive dielectric anisotropy.

According to the exemplary embodiment, the liquid crystal mixture whose refractive index anisotropy ($\Delta n$) is 0.086 is used.

When refractive index anisotropy of a liquid crystal mixture is $\Delta n$ and an average thickness of the liquid crystal layer 2400 in a transmissive display area is d1, the product ($\Delta n \times d1$) is 400 nm or more and 1000 nm or less with respect to a light having a wavelength of 589 nm.

According to the exemplary embodiment, the thickness d1 of the liquid crystal layer 2400 in a transmissive display area is about 6.0 μm, and Δn×d1 is about 516 nm with respect to a light of the wavelength of 589 nm.

Thereby, luminance of the LCD panel becomes high.

The product vale (Δn×d2) of the refractive index anisotropy Δn of the liquid crystal mixture and the average thickness d2 of the liquid crystal layer 2400 in the reflective display area is about 137.5 nm with respect to a light of the wavelength of 589 nm.

Specifically, by adjusting the thickness of the third insulating film 2219 and the thickness of the second pixel electrode 2211, the thickness d2 of the liquid crystal layer 2400 becomes about 1.6 μm.

Next, polarizers 2130 and 2230 composed of optical films are stuck on outer faces of the first substrate 2100 and the second substrate 2200 respectively.

Then, the polarizers 2130 and 2230 stuck on the substrates are arranged so that absorption axes thereof are approximately orthogonal to each other.

According to the exemplary embodiment, the absorption axis of the polarizer 2130 stuck on the first substrate 2100 is arranged nearly in parallel with the initial orientation direction 2300 of the liquid crystal mixture.

However, the absorption axis of the polarizer 2130 may be nearly orthogonal to the orientation direction 2300.

An arrangement angle of the ½ wavelength plate 2103 is set so that an incident light which is changed to a linearly polarized light with the polarizer 2130 rotates by 45 degrees.

In the exemplary embodiment, although one pixel is divided into two areas, a transmissive display area and a reflective display area, the pixel may be divided into a plurality of areas, and a transmissive display area and a reflective display area may be optionally arranged in each area.

Since the first common electrode is arranged at both a transmissive display area and a reflective display area according to the exemplary embodiment, a patterning process for a display area becomes unnecessary.

Regardless of patterning accuracy of the first common electrode and accuracy of facing arrangement of the first substrate and the second substrate, the semi-transmissive LCD panel of the invention includes a transmissive display and a reflective display both having a wide viewing angle, little variation for every display panel, high uniformity of an image display and a more cheaply sufficient yield.

A twelfth exemplary embodiment of the present invention will be described. Regarding the same configuration as the above-mentioned exemplary embodiment, description is optionally omitted using same symbol.

Figure 18:
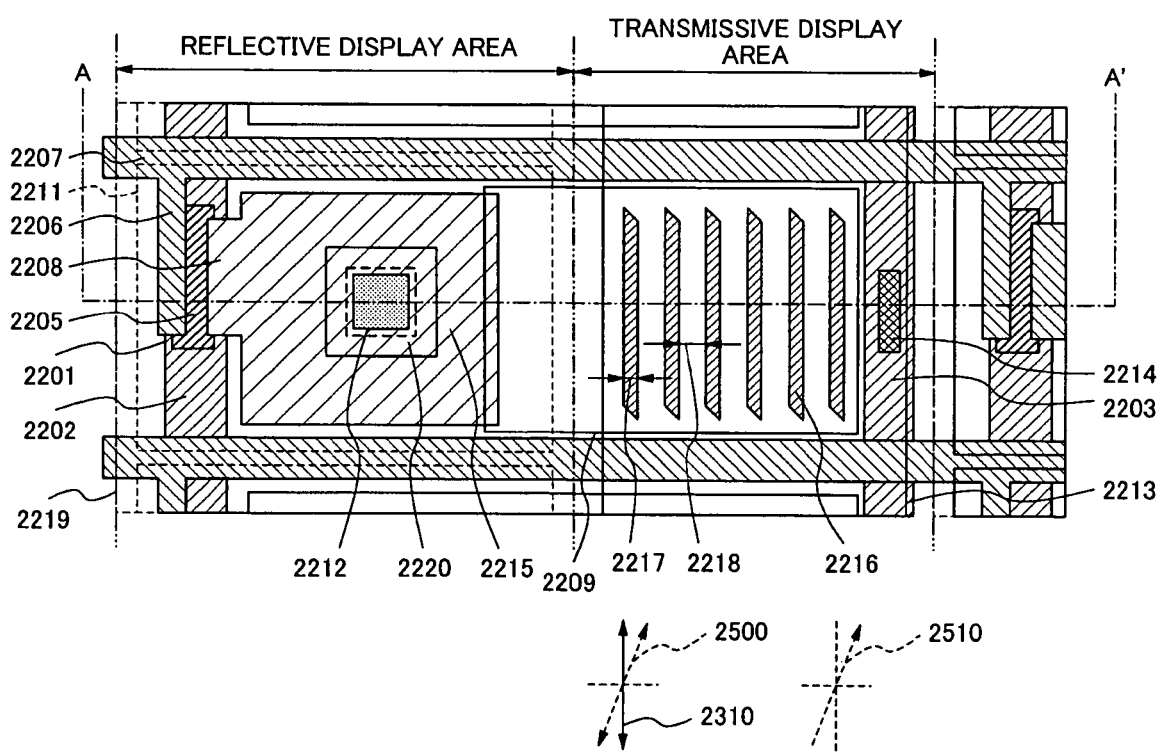
FIG. 18 is a plan view showing a configuration of one pixel of an LCD panel according to a twelfth exemplary embodiment of the present invention.
Figure 19:
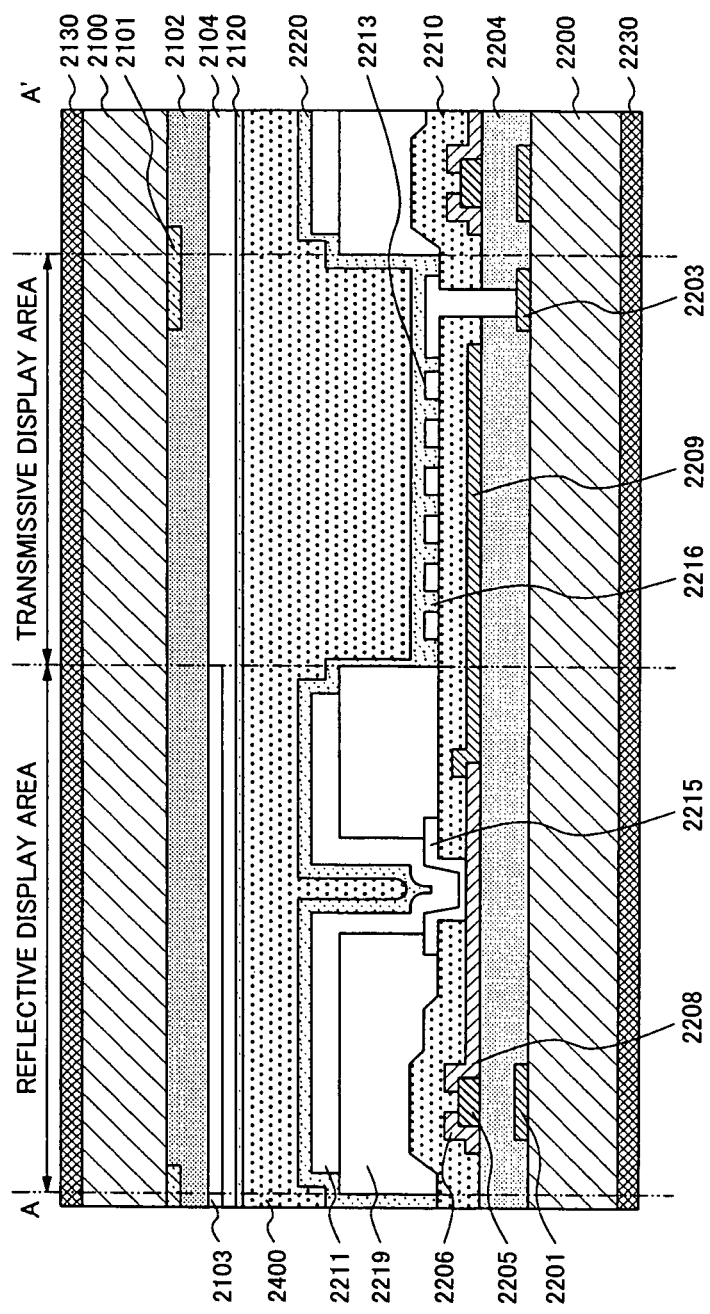
FIG. 19 is a cross sectional view along an A-A' line of FIG. 18 according to the twelfth exemplary embodiment of the present invention.

FIG. 18 is a partial cross section of an LCD panel according to the present invention, and FIG. 19 is a cross sectional view along an A-A' line of FIG. 18.

The exemplary embodiment is related with a configuration in which the second common electrode 2213 and the third insulating film 2219 do not overlap near the boundary of a reflective display area and a transmissive display area. That is, the exemplary embodiment is related with a configuration in which an edge of the third insulating film 2219 is separated from an edge of the second common electrode 2213.

Also in the exemplary embodiment, the initial orientation direction 2500 of the liquid crystal mixture is arranged in an antiparallel orientation by the orientation process.

Because two setups whose directions are different from each other by 180 degrees can be considered from the direction of an inclination of the liquid crystal orientation to the substrate surface as a setup of an antiparallel orientation, one setup is chosen optionally.

Figure 20:
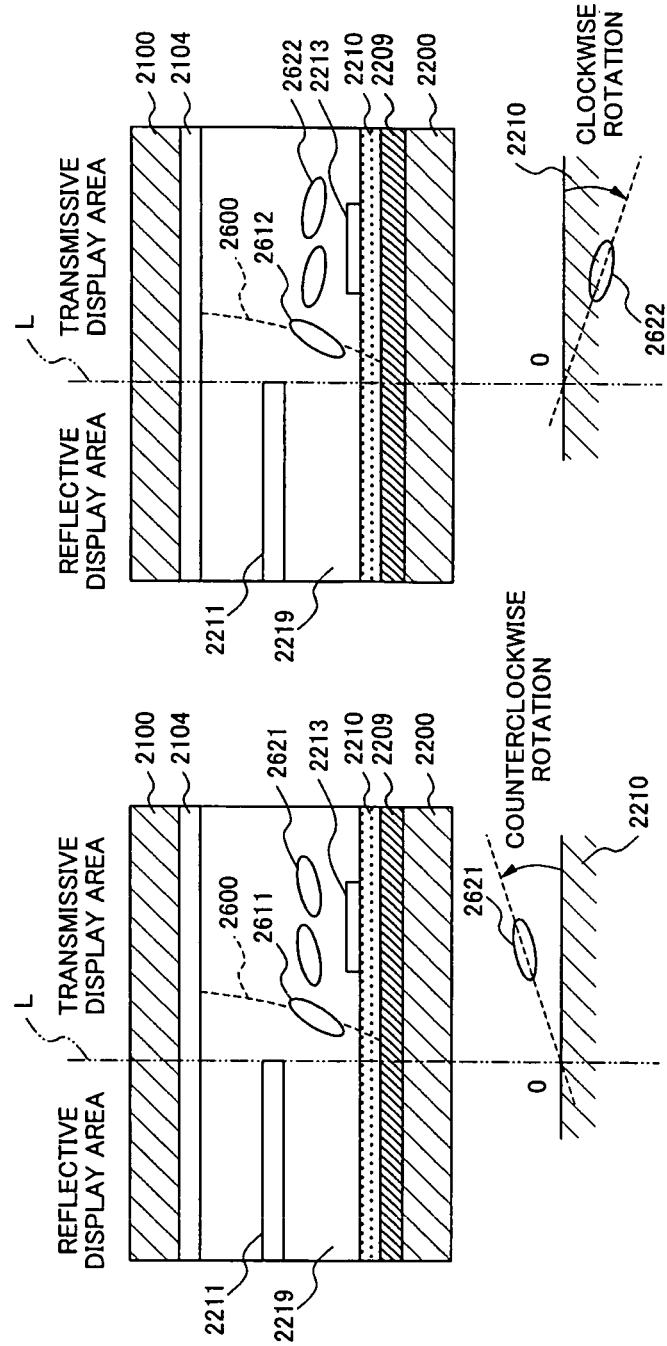
FIG. 20A is a chart showing an oriented state of a liquid crystal mixture in which liquid crystal molecules are oriented in a counterclockwise direction according to the twelfth exemplary embodiment of the present invention.
FIG. 20B is a chart showing an oriented state of a liquid crystal mixture in which liquid crystal molecules are oriented in a clockwise direction according to the twelfth exemplary embodiment of the present invention.

FIGS. 20A and 20B show cross sectional view where the second common electrode 2213 and the third insulating film 2219 do not overlap near the boundary L of the reflective display area and the transmissive display area.

FIG. 20A shows a case where the liquid crystal orientation is set in a counterclockwise direction (direction of an inclination of the liquid crystal molecule 2621), and FIG. 20B shows a case where the liquid crystal orientation is set in a clockwise direction (direction of an inclination of the liquid crystal molecule 2622).

As for the clockwise direction and the counterclockwise direction, as shown in FIG. 20A and FIG. 20B, when a center of rotation O is arranged on the boundary L of the reflective display area and the transmissive display area, the clockwise direction is a direction where a liquid crystal molecule faces upward on the paper and the counterclockwise direction is a direction where a liquid crystal molecule faces downward on the paper.

As shown in FIG. 20A and FIG. 20B, because the electric flux lines 2600 near the boundary L include the same direction of inclination, both the liquid crystal molecule 2611 and the liquid crystal molecule 2612 incline to the same direction.

The initial orientation of the liquid crystal mixture in the transmissive display area is a direction of the first substrate from a point which a boundary line in the reflective display area and the transmissive display area is crossing to the face of the second substrate.

Accordingly, because the direction of inclination of the liquid crystal molecule 2611 near the boundary L and the liquid crystal molecule 2621 on the center side away from the boundary L matches in case of FIG. 20A, comparatively uniform liquid crystal molecular orientation can be realized stably.

Therefore, good image display is obtained.

On the other hand, in FIG. 20B, because the direction of inclination of the liquid crystal molecular orientation 2612 near the boundary L and the liquid crystal molecular orientation 2622 on the center side does not match, the liquid crystal molecular orientation become inhomogeneous and tends to become unstable compared with the case of FIG. 20A.

Therefore, display quality is deteriorated, for example, a display becomes rough.

From such a viewpoint, the direction of the inclination of the liquid crystal molecule 2611 near the boundary L has to be matched with the direction of the inclination of the liquid crystal molecule 2621 of the central site which is away from the boundary L, as shown in FIG. 20A.

Accordingly, even when the second common electrode 2213 does not overlap the third insulating film 2219 near the boundary L of the reflective display area and the transmissive display area, a semi-transmissive LCD panel with sufficient display quality can be provided.

As an example of utilization of the present invention, an LCD device which utilizes for a television, a monitor and a cellular phone is mentioned. And these LCD devices can be produced by a configuration which is described in the first exemplary embodiment using an LCD panel according to each exemplary embodiment mentioned above.

While the invention includes been particularly shown and described with reference to exemplary embodiments thereof, the invention is not limited to these exemplary embodiments. It will be understood by those of ordinary skill in the art that various changes in form and details may be made therein without departing from the spirit and scope of the present invention as defined by the claims.

Further, it is the inventor's intention to retain all equivalents of the claimed invention even if the claims are amended during prosecution.

What is claimed is:

1. A liquid crystal display panel for displaying an image by controlling an orientation direction of a liquid crystal mixture with respect to each pixel, comprising:
a first common electrode formed on a first substrate;
a second common electrode formed on a second substrate and includes a predetermined opening; and
a pixel electrode formed on said second substrate, wherein said first substrate faces said second substrate so that said liquid crystal mixture with positive dielectric anisotropy is sandwiched between said first common electrode and said second common electrode, and wherein
said orientation direction of said liquid crystal mixture changes mainly in a face parallel to said second substrate according to an electric field generated from electric potential of said first common electrode, said second common electrode, and said pixel electrode,
wherein said pixel includes at least one transmissive display area for displaying an image by a transmitted light and at least one reflective display area for displaying an image by reflecting an incident light, wherein
both areas of said transmissive display area and said reflective display area include said first common electrode, wherein
said transmissive display area includes said first common electrode formed on said first substrate, and includes said second common electrode and said pixel electrode formed on said second substrate, and wherein
said orientation direction of said liquid crystal mixture changes mainly in said face parallel to said second substrate according to an electric field generated from said electric potential of said first common electrode, said second common electrode, and said pixel electrode,
wherein said reflective display area includes said first common electrode formed on said first substrate and
a second pixel electrode formed on said second substrate, and wherein
said orientation direction of said liquid crystal mixture changes mainly in said a face vertical to said second substrate according to an electric field generated from said electric potential of said first common electrode and said second pixel electrode.

2. The liquid crystal display panel according to claim 1, wherein an initial orientation of said liquid crystal mixture is an antiparallel orientation.

3. The liquid crystal display panel according to claim 1, wherein said second pixel electrode is formed on said second substrate via a third insulating film including a single layer film or a multilayer film each made of an organic film.

4. The liquid crystal display panel according to claim 1, wherein said pixel electrode is connected with said second pixel electrode, and an electric potential based on a same signal being applied to each electrode.

5. The liquid crystal display panel according to claim 3, wherein said third insulating film overlaps said second common electrode in a boundary section of said transmissive display area and said reflective display area.

6. The liquid crystal display panel according to claim 3, wherein an edge of said third insulating film keeps away from an edge of said second common electrode in a boundary section of said transmissive display area and said reflective display area.

7. The liquid crystal display panel according to claim 6, wherein an initial orientation of said liquid crystal mixture in said transmissive display area is a direction of said first substrate from a point that a boundary line in said reflective display area and said transmissive display area is crossing to the face of said second substrate.

8. A liquid crystal display device for displaying an image by controlling an orientation direction of a liquid crystal mixture with respect to each pixel, comprising:
a liquid crystal panel including,
a first common electrode formed on a first substrate;
a pixel electrode formed on a second substrate;
an insulating film formed on said pixel electrode; and
a second common electrode formed on said insulating film and includes a predetermined opening, and
a backlight for illuminating said liquid crystal panel, wherein
a transmittance of a light from said backlight is controlled with respect to each pixel when said orientation direction of said liquid crystal mixture with positive dielectric anisotropy changes mainly in a face parallel to said second substrate according to an electric field generated from each of said electrodes,
wherein said pixel includes at least one transmissive display area for displaying an image by a transmitted light and at least one reflective display area for displaying an image by reflecting an incident light, wherein
both areas of a transmissive display area and said reflective display area include said first common electrode, wherein
said transmissive display area includes said first common electrode formed on said first substrate, and includes said second common electrode and said pixel electrode formed on said second substrate, and wherein
said orientation direction of said liquid crystal mixture changes mainly in said face parallel to said second substrate according to said electric field generated from an electric potential of said first common electrode, said second common electrode, and said pixel electrode,
wherein said reflective display area includes said first common electrode formed on said first substrate and a second pixel electrode formed on said second substrate, and wherein
said orientation direction of said liquid crystal mixture changes mainly in a face vertical to said second substrate according to said electric field generated from said electric potential of said first common electrode and said second pixel electrode.

* * * * *